(12) United States Patent
Bush et al.

(10) Patent No.: US 10,721,259 B2
(45) Date of Patent: Jul. 21, 2020

(54) SYSTEM AND METHOD FOR AUTOMATIC GENERATION OF FILTER RULES

(71) Applicant: The Boeing Company, Chicago, IL (US)

(72) Inventors: John E. Bush, Bothell, WA (US); Arun Ayyagari, Seattle, WA (US); Steven L. Arnold, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/088,006

(22) Filed: Mar. 31, 2016

(65) Prior Publication Data

US 2017/0289189 A1 Oct. 5, 2017

(51) Int. Cl.
*H04L 29/06* (2006.01)
*H04L 12/26* (2006.01)
(Continued)

(52) U.S. Cl.
CPC ........ *H04L 63/1433* (2013.01); *H04L 43/028* (2013.01); *H04L 43/12* (2013.01);
(Continued)

(58) Field of Classification Search
CPC . H04L 63/02; H04L 63/0227; H04L 63/0236; H04L 63/0245; H04L 63/0254;
(Continued)

(56) References Cited

U.S. PATENT DOCUMENTS

| 7,810,151 B1 * | 10/2010 | Guruswamy | ........... G06F 21/00 |
| | | | 709/223 |
| 8,397,286 B2 * | 3/2013 | Declety | ............... H04L 63/0209 |
| | | | 713/166 |

(Continued)

OTHER PUBLICATIONS

Air Informatics LLC, http://www.airinformatics.com/e-Enabled_Definition.html, pp. 1-2, 2018.*

(Continued)

*Primary Examiner* — Theodore C Parsons
*Assistant Examiner* — Thomas Ho
(74) *Attorney, Agent, or Firm* — Kwan & Olynick LLP

(57) ABSTRACT

In general, certain embodiments of the present disclosure provide methods and systems for automatic generation of filter rules based on functional network flows for e-Enabled aviation systems. According to various embodiments, a method is provided comprising capturing network packets corresponding to a functional network flow transmitted within a networked aviation system, and parsing the network packets in order to extract one or more network messages corresponding to the functional network flow. The network message is examined in order to identify and classify a plurality of attributes corresponding to the header and data fields of the network packets. A table corresponding to the network messages is automatically generated, which includes one or more filter rules. In some embodiments, the table may be used to determine which communications are authorized during a particular context of the networked aviation system. The method further comprises validating the one or more filter rules.

20 Claims, 12 Drawing Sheets

(51) Int. Cl.
*H04L 12/813* (2013.01)
*H04L 29/08* (2006.01)

(52) U.S. Cl.
CPC .............. *H04L 47/20* (2013.01); *H04L 63/10* (2013.01); *H04L 63/1408* (2013.01); *H04L 63/1441* (2013.01); *H04L 63/20* (2013.01); *H04L 67/12* (2013.01); *H04L 69/22* (2013.01)

(58) Field of Classification Search
CPC ... H04L 63/0263; H04L 63/20; H04L 63/029; H04L 63/1433; H04L 43/028; H04L 47/20; H04L 43/12; H04L 63/1408; H04L 69/22; H04L 67/12; H04L 63/1441; H04L 63/10; H04L 47/2441
See application file for complete search history.

(56) References Cited

U.S. PATENT DOCUMENTS

| | | | | |
|---|---|---|---|---|
| 8,693,344 | B1* | 4/2014 | Adams | H04L 41/0893 370/241 |
| 8,826,429 | B2* | 9/2014 | Freeman | H04L 63/1408 726/22 |
| 8,997,227 | B1* | 3/2015 | Mhatre | H04L 63/1416 726/23 |
| 2003/0120622 | A1* | 6/2003 | Nurmela | H04L 63/0227 706/47 |
| 2007/0115938 | A1* | 5/2007 | Conzachi | G07C 5/008 370/352 |
| 2007/0183435 | A1* | 8/2007 | Kettering | H04L 63/0227 370/401 |
| 2010/0088742 | A1* | 4/2010 | Wiryaman | H04L 63/20 726/1 |
| 2010/0257581 | A1* | 10/2010 | Leconte | G06F 21/554 726/1 |
| 2011/0218701 | A1* | 9/2011 | Ric | H04L 63/0245 701/31.4 |
| 2014/0052791 | A1* | 2/2014 | Chakra | H04L 51/12 709/206 |
| 2015/0163242 | A1* | 6/2015 | Laidlaw | G06F 21/552 726/22 |
| 2015/0256512 | A1* | 9/2015 | Leconte | H04L 63/107 726/1 |
| 2018/0375747 | A1* | 12/2018 | Bush | H04L 43/028 |

OTHER PUBLICATIONS

"European Application Serial No. 17161680.8, Search Report dated May 31, 2017", 10 pgs.

"European Application Serial No. 17161680.8, Office Action dated Jan. 10, 2019", 7 pgs.

"European Application Serial No. 17161680.8, Office Action dated Jun. 24, 2019", 9 pgs.

"European Application Serial No. 17161680.8, Office Action dated Nov. 22, 2019", 6 pgs.

"European Application Serial No. 17161680.8, Office Action dated May 23, 2018", 5 pgs.

* cited by examiner

SYSTEM AND METHOD FOR AUTOMATIC GENERATION OF FILTER RULES

TECHNICAL FIELD

The present disclosure relates generally to cyber-security, and, more specifically, to methods and systems for the automatic generation of filter rules used in mitigating cyber-security threats to aviation platforms and infrastructures.

BACKGROUND

The e-Enabling of the aviation platforms and infrastructures, both onboard and off-board, have resulted in interconnected physical systems and supply chain infrastructures that are now a potential target for the dynamic and growing cyber security threats due to greater access to the networked computing systems. Aviation platforms and infrastructures are complex systems that involve hierarchically networked, embedded systems and controllers with varying operational criticality, reliability, and availability requirements. In various embodiments, embedded systems and controllers are increasingly hosted on general purpose computing hardware, commercial software operating systems, and specific custom applications performing the intended system functions. These onboard embedded systems and controllers may be networked via Internet Engineering Task Force (IETF) and Aeronautical Radio, Inc. (ARINC) standards-based protocols such as the Internet Protocol (IP) and Institute of Electrical and Electronics Engineers (IEEE) wired and wireless communications and networking protocols. In addition, the onboard systems may be networked with off-board computing systems via standard IETF IP based protocols such as User Datagram Protocol (UDP) and Transmission Control Program (TCP). The increased use of standards-based computing and communication protocols may allow for seamless integration of the e-Enabled architecture, but may also increase the vulnerability to cyber security attacks.

Furthermore, the current definition of airplane network data flows is not in a machine understandable form requiring manual interpretation for the creation of network filter rules suitable for a domain guard use. This can lead to errors and coverage gaps. Thus, there is a need for system and method for automatically generating filter rules, including deep packet filtering rules needed to prevent unauthorized data flows on e-Enabled aviation platforms.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

In general, certain embodiments of the present disclosure provide techniques or mechanisms for automatically generating filter rules based on functional network flows for e-Enabled aviation platforms and infrastructures. According to various embodiments, a method is provided comprising capturing, by a processor of a computer system, one or more network packets corresponding to a functional network flow that is transmitted within a networked aviation system. The method further comprises parsing, by the processor, the one or more network packets in order to extract one or more network messages corresponding to the functional network flow.

The method further comprises examining, by the processor, a network message of the one or more network messages in order to identify a plurality of attributes. In some embodiments, the plurality of attributes correspond to the header and data fields of the one or more network packets corresponding to the network message. In some embodiments, the plurality of attributes may include a combination of one or more of the following: a flight phase, a function, a sub-function, a data flow, and a protocol. In some embodiments, examining the network message may include identifying the flight phase of the functional network flow and labeling the functional network flow with the flight phase. In some embodiments, the flight phase may include one or more of the following aircraft operational states: power on, pre-flight, engine start, in-gate, taxi-out, takeoff, initial climb, climb, enroute cruise, descent, approach land, rollout, taxi-in, go around, and engine shutdown. In some embodiments, examining the network message may include identifying the function of the network message and labeling said network message with said function. In some embodiments, examining the network message may further include identifying the sub-function of the network message and labeling said network message with said sub-function. In some embodiments, examining the network message may also include identifying the data flow of the network message and labeling said network message with said data flow, and identifying the protocol of the network message and labeling said network message with said protocol.

The method further comprises classifying the plurality of attributes of the network message. In some embodiments, the plurality of attributes may be classified by a classification module executed on the processor. In some embodiments, classifying the plurality of attributes may include searching one or more sources to retrieve previously classified attributes corresponding to predetermined functional network flows. In some embodiments, the one or more sources may include local storage or global databases accessed through a global network. In other embodiments, classifying the plurality of attributes may additionally, or alternatively, include prompting a user to input a classification for one or more labeled attributes.

The method further comprises automatically generating a table corresponding to the one or more network messages corresponding to the functional network flow. In some embodiments, the table includes one or more filter rules and the table may be used to determine which communications are authorized during a particular context of the networked aviation system. In some embodiments, the table may correspond to a grouping of one or more functional network flows and is organized by the flight phase of the one or more network messages. The method further comprises validating the one or more filter rules. In some embodiments, the method may further comprising creating a plurality of stateful filter rules by chaining one or more tables based on an attribute of the one or more network messages. In some embodiments, the one or more filter rules may include one or more deep packet filtering rules. The one or more deep packet filtering rules may prevent unauthorized data flows on e-Enabled aviation platforms by examining the payloads of the one or more network packets.

In yet another embodiment, a system is provided comprising one or more processors and memory. The system further comprises one or more programs stored in the memory. In yet another embodiment, a computer readable storage medium is provided storing one or more programs configured for execution by a computer. In various embodiments, the one or more programs include instructions for capturing, by a processor of a computer system, one or more network packets corresponding to a functional network flow transmitted within a networked aviation system. The one or more programs further include instructions for parsing, by the processor, the one or more network packets in order to extract one or more network messages corresponding to the functional network flow. The one or more programs further include instructions for examining, by a processor, a network message of the one or more network messages in order to identify a plurality of attributes. In some embodiments, the plurality of attributes may correspond to the header and data fields of the one or more network packets corresponding to the network message. The one or more programs further comprise instructions for classifying the plurality of attributes of the network message. In some embodiments, the plurality of attributes may be classified by a classification module executed on the processor. The one or more programs further include instructions for automatically generating a table corresponding to the one or more network messages corresponding to the functional network flow. In some embodiments, the table includes one or more filter rules and the table may be used to determine which communications are authorized during a particular context of the networked aviation system. The one or more programs further include instructions for validating the one or more filter rules.

BRIEF DESCRIPTION OF THE DRAWINGS

The disclosure may best be understood by reference to the following description taken in conjunction with the accompanying drawings, which illustrate particular embodiments of the present disclosure.

DETAILED DESCRIPTION OF PARTICULAR EMBODIMENTS

Figure 1A:
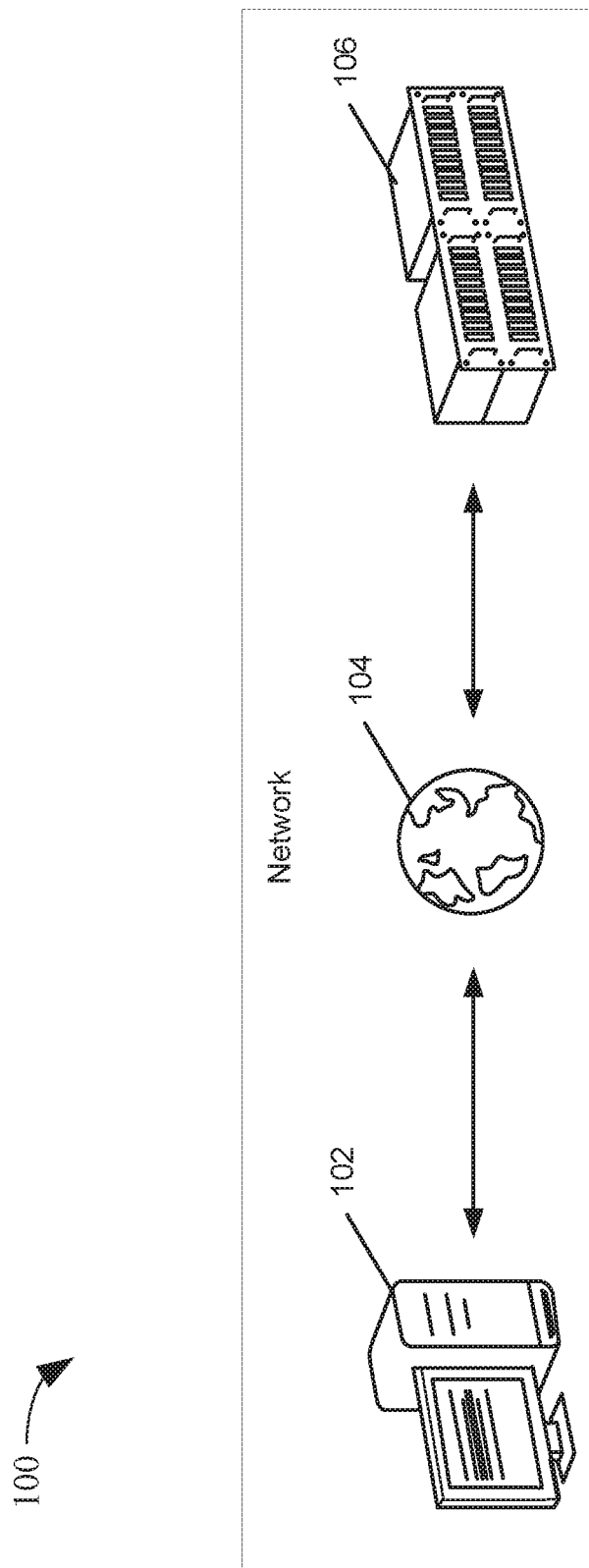
FIG. 1A illustrates a general overview of an example system for implementing various methods of the present disclosure, in accordance with one or more embodiments.

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

For example, the techniques of the present disclosure will be described in the context of particular functions, sub-functions, and data flows of certain network messages. However, it should be noted that the techniques of the present disclosure apply to other functional network flows and/or protocols with various functions, sub-functions, and data flows. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

The present disclosure provides a system and method for the automatic generation of filter rules to prevent unauthorized data flows between systems on an e-Enabled aviation platform. Network packets from one or more communicating systems on an e-Enabled aviation platform are captured in order to create the firewall filter rules to control the flow of information between the systems.

In some embodiments, the airplane network data flows are defined in a machine understandable format by capturing network packets from one or more communicating systems. The network packets are parsed into one or more network messages which are examined for particular attributes. The attributes may then be automatically classified or classified by a user. Filter rules are generated from the classified network data flows. In some embodiments, the filter rules may be IPtables like rules. In some embodiments, the filter rules may further include deep packet filtering rules. In some embodiments, the filter rules can be extended to capture the stateful behavior by chaining the simple IPtable rules.

Example Embodiments

FIG. 1A illustrates a general overview of an example system 100 for implementing various methods of the present disclosure, in accordance with one or more embodiments. In particular, FIG. 1 describes a user accessing a network 104 using a computer 102 configured with a web browser to interact with another computer 106. In some embodiments, computer 106 may be configured as a server containing modules required for fulfilling the user's request. In some embodiments, computers 102 and/or 106 may be general purpose computers. In other embodiments, computers 102 and/or 106 may be specialized avionic devices, such as line replaceable units (LRUs), that include configurable controls and interface systems for operating in a networked aviation system, platform, and/or architecture. In other embodiments, system 100 may include other devices and/or computers connected to computers 102 and 106 via network 104. In some embodiments, network 104 may be an Ethernet connection and/or other standard internet and local area network (LAN) technologies, including IP and UDP. In other embodiments, network 104 may be any other direct and/or wireless network.

Figure 1B:
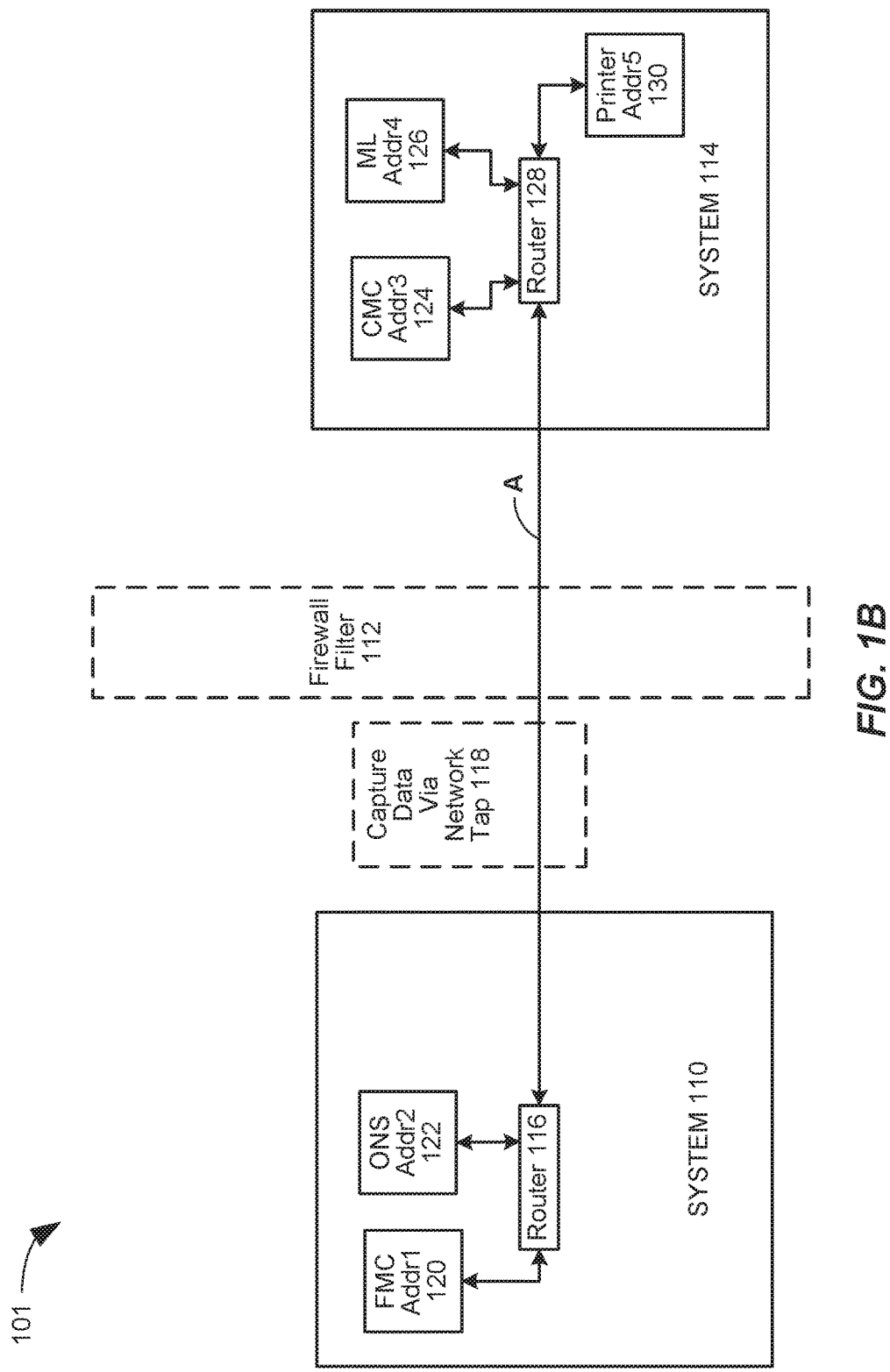
FIG. 1B illustrates an example system for capturing network packets, in accordance with one or more embodiments.

FIG. 1B shows an example system architecture 101 for capturing network packets, according to one or more embodiments of the present disclosure. Two systems, system 110 and system 114, are connected via an Ethernet connection, such as network 104. Each system (110 or 114) could be a computer system including computers 102 or 106, or avionics systems like single line replaceable unit (LRU) or a collection of LRUs. An LRU may comprise a modular component of an airplane, ship, or spacecraft (or any other manufactured avionic device) that is designed to be replaced quickly at an operating location. An LRU may be a sealed unit such as a radio or other auxiliary equipment. For example, system 110 and/or system 114 may be communication components and/or computers of an aircraft, a satellite, a control tower, a cellular tower, other off-board systems that communicate with in-aircraft networks, and/or simulations thereof. FIG. 1 shows system 110 made up of a Flight Management Computer 120 (FMC) and an On Board Network System 122 (ONS) communicating through a router 116. System 114 is made up of three LRUs including a Central Maintenance computer 124 (CMC), Maintenance Laptop 126 (ML) and a Printer 130 communicating through a router 128.

One of the purposes of the present disclosure is to provide a means to automatically create the firewall filter rules for firewall 112 to control the flow of information between system 110 and system 114. The connection between system 110 and system 114 over network 104 is depicted by arrow A. In various embodiments, data transferred between system 110 and system 114 may be captured by a network tap 118 anywhere along arrow A by monitoring the connection between system 110 and system 114. In various embodiments, the data may be captured by another computer connected to network 104, such as computers 104 and/or 106. In certain embodiments, data may be captured by various methods, including, but not limited to, packet capture ("PCAP") software to record all of the data packets transmitted between system 110 and system 114. The data packets include one or more network messages. Once captured, the data packets may then be parsed, examined, classified, and grouped into functional network flows in order to create filter rules for firewall 112 to control the flow of information between system 110 and system 114, as will be further described below. A functional network flow may correspond to a group of network messages which corresponds to a higher level airplane function, sub=function, data flow, and protocol.

The functional flows of major airplane functions like flight management, printing, data loader, or central maintenance might contain sub-functions which can also be described as different data flows. In some embodiments, the data flows are either a temporal or protocol exchange. Example functional flows used to illustrate this disclosure process include:
  1. Dataload (protocol)
    a. IEEE 802.1x authentication/connection
    b. Establishing the ARINC 615A session
    c. Performing Data load operation utilizing the Trivial File Transfer Protocol (TFTP) protocol
    d. Closing the ARINC 615A session
  2. Printer job (Protocol)
  3. Central Maintenance computing functions (CMCF)
    a. Continuous (Build In Test Equipment) BITE reporting which does not establish a session (temporal)
    b. Query of LRU configuration report from CMCF (Protocol)

Figure 2A:
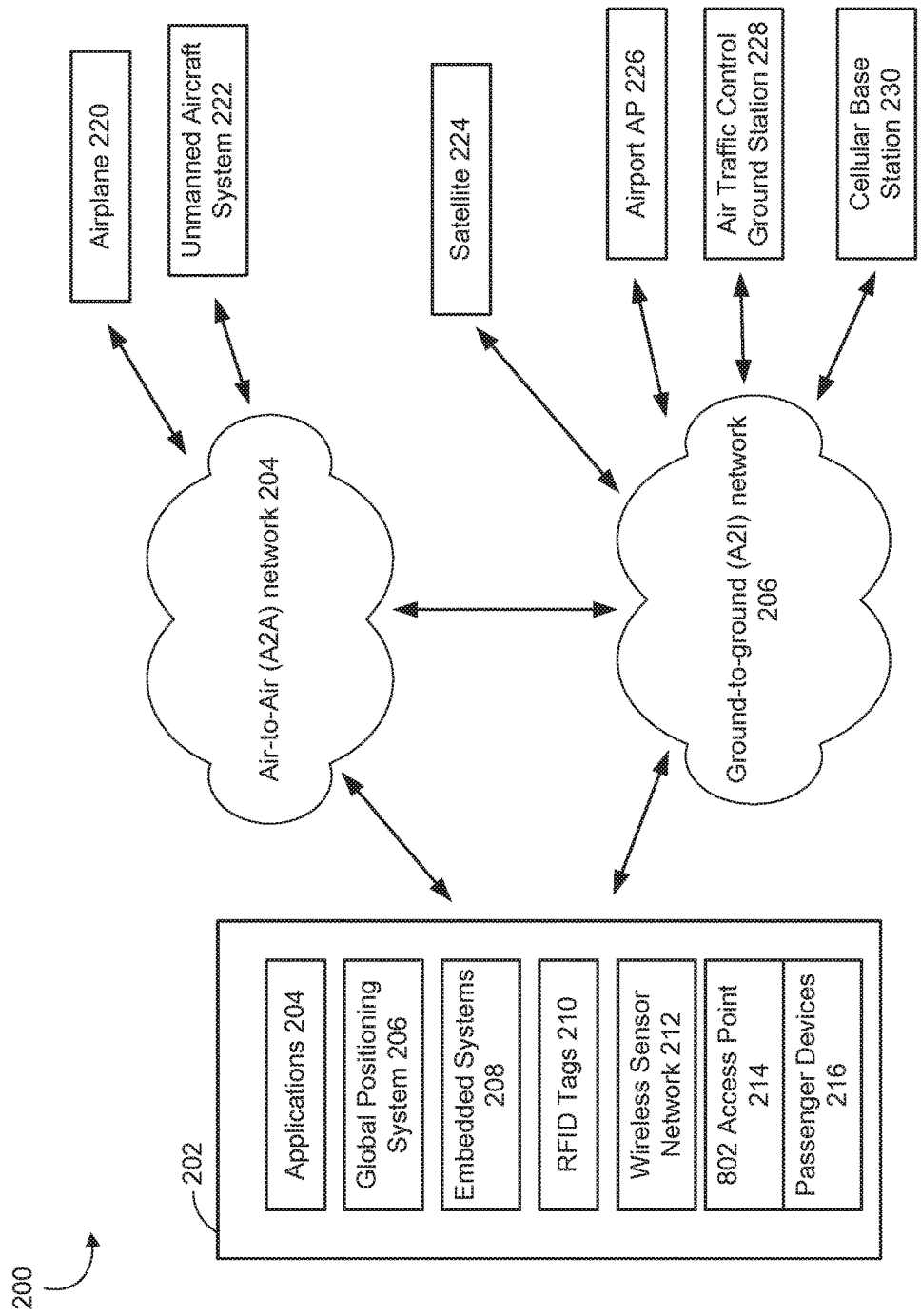
FIG. 2A illustrates an example of an e-Enabled aviation platform, in accordance with one or more embodiments.

FIG. 2A illustrates an example of an e-Enabled aviation platform 200 that may be implemented in conjunction with the techniques and mechanisms of the present disclosure in accordance with one or more embodiments. Aviation platforms and infrastructures are rapidly adopting e-Enabled architectures and technologies to take advantage of the operational and performance efficiencies that result from being networked. In various embodiments of platform 200, an e-Enabled aircraft 202 may be connected to various entities through an aircraft to aircraft (A2A) network 204 and/or an aircraft to ground (A2I) network 206. In some embodiments, aircraft 202 may include various in-aircraft network systems with corresponding communication radios including global position system (GPS) 206, embedded systems 208, radio frequency identification (RFID) tags 210, wireless sensor network 212, 802.11 access points 214, and passenger devices 216. In some embodiments, aircraft 202 may also include applications 204 which integrate the multiple data sources between airplane 202 and ground systems. In some embodiments, the data sources may carry information corresponding to loadable software (e.g., navigation databases, electronic flight bag, weather reports), health data (e.g., wireless sensor and tag data, diagnostics), and traffic control data (e.g., traffic beacons). In some embodiments, the aircraft network systems may be systems 110 and 114, and may include computers and/or servers, such as computers 102 and 106. In some embodiments, applications 204 may be located on computers, such as computers 102 and 106, and systems, such as systems 110 and 114. In some embodiments, the in-aircraft network systems may include a secure data network that is secured by a firewall, such as firewall filter 112.

In some embodiments, the e-Enabled airplane 202 may have multiple entities communicating with it for each application, including: e-commerce merchants, airplane manufacturers, onboard equipment suppliers, airlines, aeronautical and other network service providers, servicers (for maintenance), air traffic control (ATC) centers, regulatory agencies (e.g., the Federal Aviation Administration), and other airplanes, such as airplane 220 and unmanned aircraft 222. For example, the in-aircraft network systems may send information to and/or receive information from another airplane 220 and/or unmanned aircraft system 222 via A2A network 204. Such information may include an Automatic Dependent Surveillance-Broadcast (ADS-B) based on 1090 MHz Extended Squitter link or other beacons for identifying and tracking aircraft. For example, using an ADS-B datalink, each aircraft 202, 220, and 222 may automatically transmit its precise position, its velocity (both vertically and horizontally), as well as its altitude and other information to controllers and other nearby aircraft.

Similarly, the in-aircraft network systems may send information to and/or receive information from airline infrastructure entities by communicating with satellite 224, airport access point 226, ATC ground station 228, and/or cellular base station 230, via A2I network 206. In some embodiments, A2I links with airline infrastructure entities can be made via a broadband satellite (via SATCOM) when the airplane is in-the-air or an 802.11 link when on-the-ground. In some embodiments, an ATC center may transmit beacons, traffic information, and/or other navigational information via air traffic control ground station 228. In some embodiments, communications with the ATC ground stations may be via aeronautical protocols over satellite or terrestrial radio links. ADS-B may provide an additional Mode S radio link with the ATC centers. In some embodiments, third party providers may provide internet, broadband, and other services via cellular base station 230.

The e-Enabling of the aviation platforms and infrastructures, both onboard and off-board, have resulted in interconnected physical systems and supply chain infrastructures that are now a potential target for the dynamic and growing cyber security threats due to greater access to the networked computing systems. Aviation platforms and infrastructures are complex systems that involve hierarchically networked, embedded systems and controllers with varying operational criticality, reliability, and availability requirements. Furthermore, embedded systems and controllers are increasingly hosted on general purpose computing hardware, commercial software operating systems, and specific custom applications performing the intended system functions. These onboard embedded systems and controllers are networked via IETF and ARINC standards-based protocols such as IP and IEEE wired and wireless communications, and networking protocols. In addition, the onboard systems are network with off-board computing systems via standard IETF IP based protocols such as UDP and TCP. The increased use of standards-based computing and communication protocols allow for seamless integration of the e-Enabled architecture but also increases the vulnerability to cyber security attacks.

In various embodiments, some entities connected in the e-Enabled aviation platform 200 may be trusted entities and some entities may be untrusted entities. Thus, it is important to prevent unauthorized data flows on such e-Enabled aviation platforms and filter the information and/or communications based on the context of the system, including the flight phase, location of aircraft, time, and location. However, the current definition of airplane network data flows is not in a machine understandable form requiring manual interpretation for the creation of network filter rules suitable for a domain guard use, which can lead to errors and coverage gaps. The current definition is contained in paper interface control drawings describing the data flows. In step 353 the Subject Matter Expert (SME) will manually classify the flows. This is an iterative process so initially the knowledge base (STEP F in FIG. 2B), will be empty. Each time the network messages are classified into functional network flows, the knowledge base will store this classification and then the next time that message is present it will be automatically classified. Thus, there is a need for the automatic generation of filter rules that are implemented in firewalls in e-Enabled aviation platforms, such as 112.

Figure 2B:
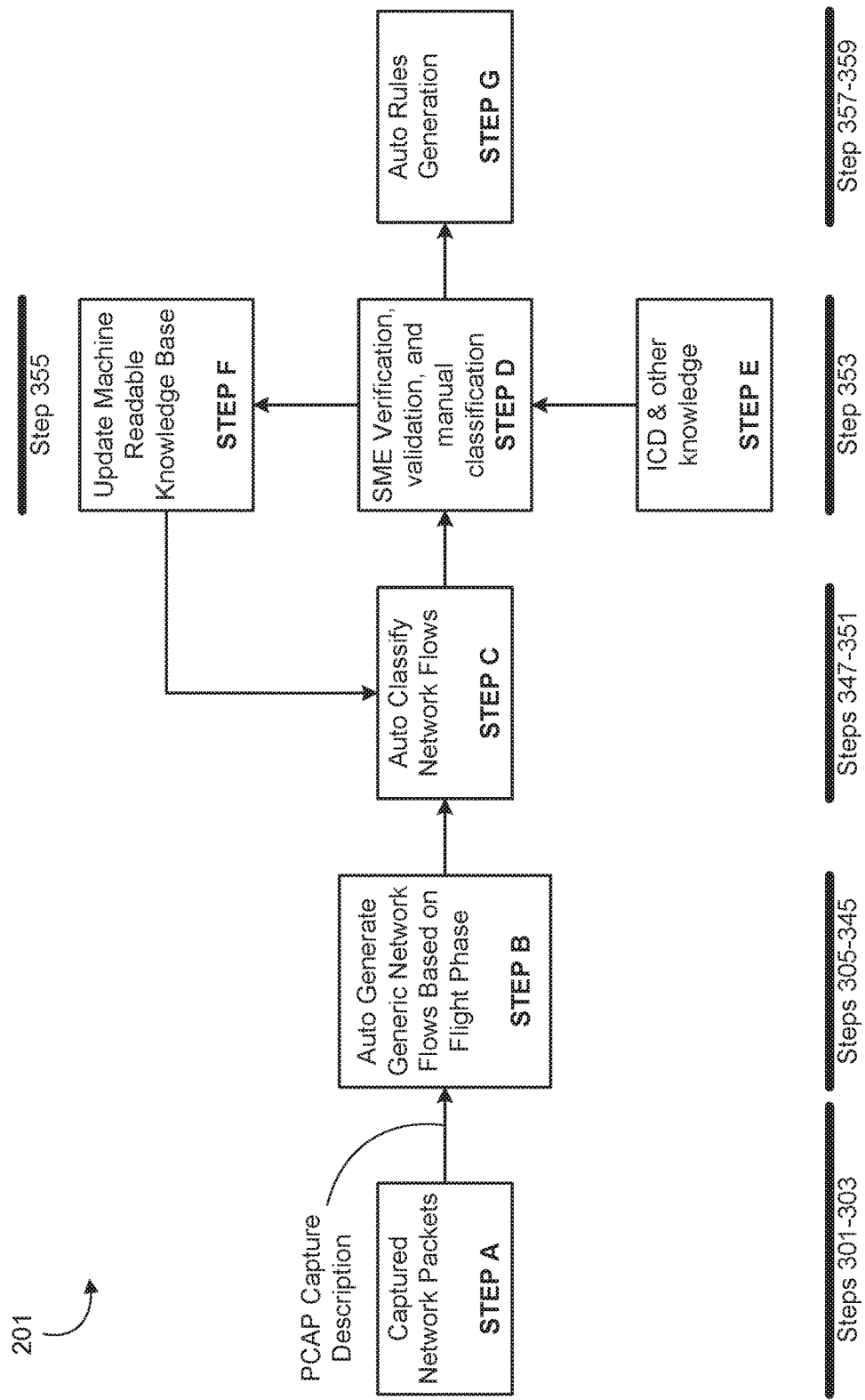
FIG. 2B illustrates an example flowchart 201 illustrating the high level steps for automatic generation of filter rules, in accordance with one or more embodiments.

FIG. 2B shows an example flowchart 201 illustrating the high level steps for automatic generation of filter rules, in accordance with one or more embodiments. The detailed steps of each function are highlighted and described in FIG. 3A, FIG. 3B and FIG. 3C. At Step A, network packets are captured, such as by network tap 118 utilizing PCAP software. Such software may then generate a PCAP capture description. This step is further described below in steps 301 to 303. At step B, generic network flows based on flight phases are automatically generated. Step B is further described in steps 305 to 345 below. At step C, the network flows are automatically classified, as further described below in steps 347-351. In some embodiments, the network flows are classified by a predefined knowledge base, from step F described below.

At step D, the classification of the network flows are verified and/or validated by a subject matter expert (SME). In some embodiments, any network flows that were not automatically classified in step C may be manually classified by the SME at step D. In some embodiments, the SME may use interface control documents (ICDs) and/or other knowledge in the verification, validation, and manual classification of the network flows, as depicted in step E. The communication boundaries between the Global Positioning System and other systems, as well as within the GPS itself, are known as interfaces. Interfaces are documented in Interface Control Documents (ICDs). ICDs are the formal means of establishing, defining, and controlling interfaces and for documenting detailed interface design definition for the GPS program. Steps D and E are further described below in step 353.

After such network flows have been manually classified, a machine readable knowledge base is updated with such classifications at step F. The machine readable knowledge base may then be used to automatically classify network flows at step C, as previously described. Step F is further described in step 355 below. Verified and/or validated network flows are then used for the automatic generation of filter rules at step G. Step G is further described in steps 357 to 359 below.

Figure 3A:
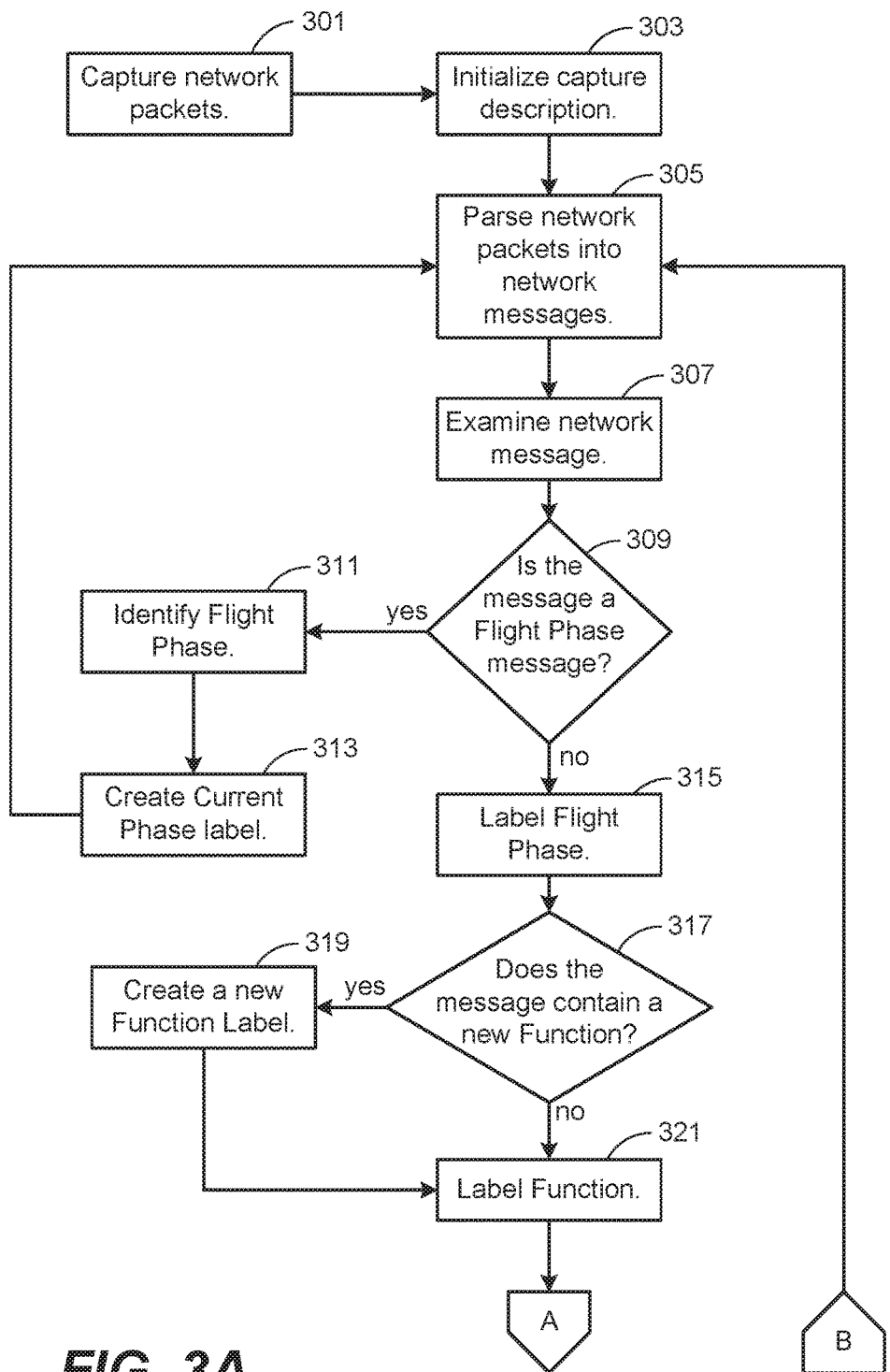
FIGS. 3A, 3B, and 3C illustrate an example of a method for automatic generation of filter rules, in accordance with one or more embodiments.
Figure 3B:
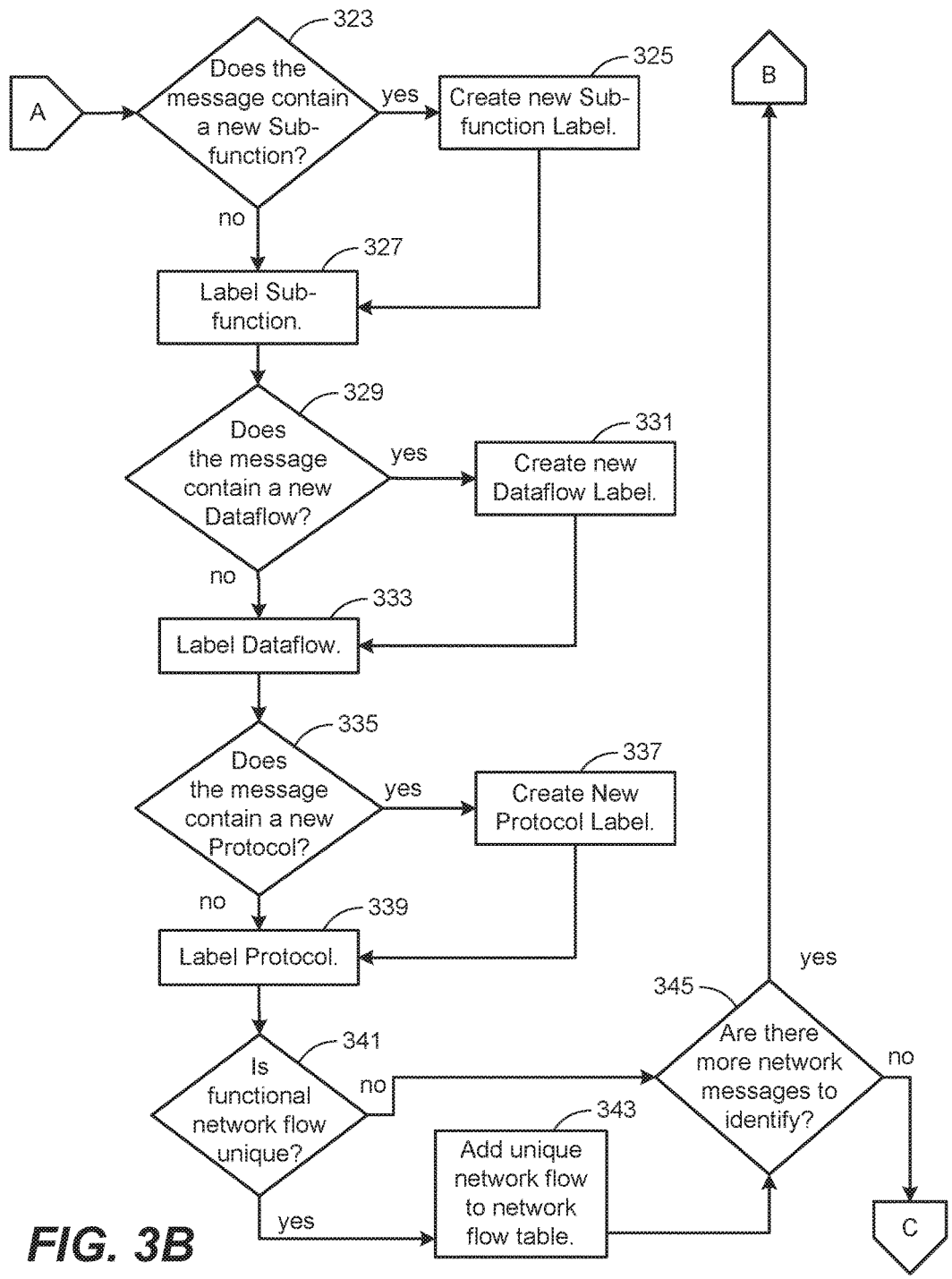
Figure 3C:
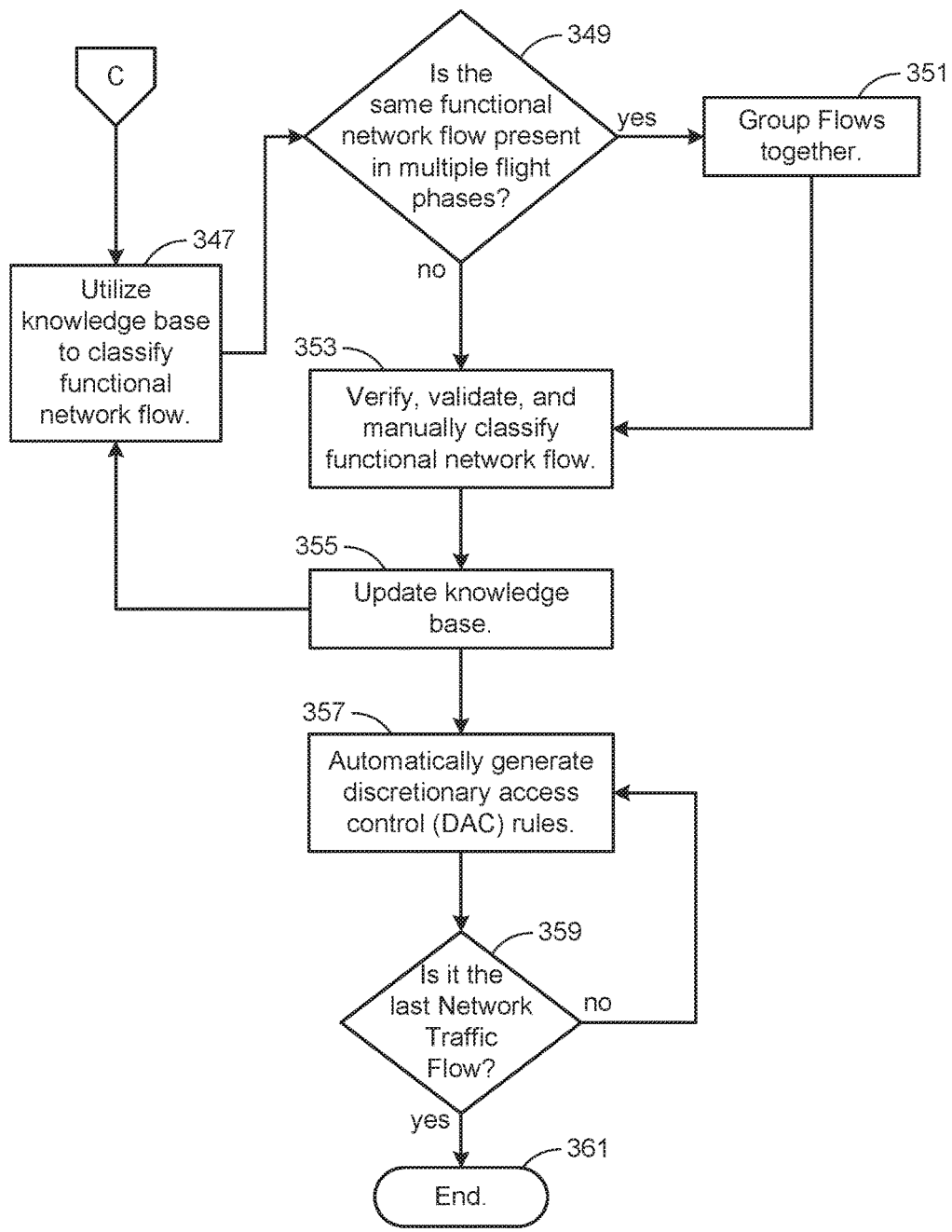

FIG. 3A, FIG. 3B, and FIG. 3C illustrate an example method 300 of automatic generation of filter rules, in accordance with one or more embodiments. At step 301, network packets, and data contained therein, are captured. In some embodiments, the network packets are transmitted along a network, such as network 104 and are captured by network tap 118 utilizing a network packet analyzer tool or other PCAP software. In some embodiments, these network packets contain the information corresponding to one or more functional network flows. In various embodiments, the network packets may be transmitted from various different sources, such as system 110 and/or system 114. In certain embodiments, such PCAP flows may be captured during unit bench testing of the line replaceable unit, during systems integration label testing, and/or during actual system flight test. In some embodiments, the packet capture module 646 is contained on the same computer as the network packet parsing module 648, network message examining module 650, classification module 652, and/or rule generating module 654 as shown in system 600. In other embodiments, the network packet analyzer could be a stand-alone machine and the machine readable PCAP file can be transferred to the automatic rules generation machine depicted in FIG. 6.

At step 303, a capture description is initialized. In some embodiments, the capture description describes the test conditions of the capture to help identify any initial conditions of the system, such as flight phase. In some embodiments, the flight phase may be initialized as unknown. In other embodiments, the system identifies a capture description based on the context of when the network flow is captured. For example, the aircraft may be in any one of the following flight phases: power on, pre-flight, engine start, in-gate, taxi-out, takeoff, initial climb, climb, enroute cruise, descent, approach land, rollout, taxi-in, go around, and engine shutdown. As another example, the system may be in operational mode during flight phases in which the aircraft away from the gate and/or in the air. Alternatively, if the aircraft is on the ground, the system may be in maintenance mode. In some embodiments, an aircraft may be considered on the ground during one or more flight phases between the time the aircraft arrives at a terminal gate and the time it departs on its next flight. Such flight phases may include, but are not limited to, in-gate, engine shutdown, pre-flight, and engine start. In other embodiments, an aircraft may also be considered on the ground during other flight phases, such as taxi-in and taxi-out. In some embodiments, typical maintenance actions are allowed only when the system is in maintenance mode, such as downloading of shop fault data, queries for configuration information, and data load of new operational or configuration data into the line replaceable units (LRU).

At step 305, the network packets are parsed into network messages. In some embodiments, data files from the packet analyzer tool may be used to parse the network packets into network messages. At step 307, each network message is examined and further parsed to determine the source address, destination address, and/or protocol of each network message. In certain embodiments, step 307 includes examination and parsing of each network message to identify and/or define additional attributes as described in steps 309 to 339 below. In various embodiments, such attributes may include flight phase, function, sub-function, data flow, and/or protocol. Accordingly, the network messages, and their corresponding attributes, are to be classified into functional network flows. In some embodiments, a functional network flow may correspond to one or more network messages contained in one or more network packets. In other embodiments, there may be a one to one correlation between a functional network flow and a network message.

At step 309, the system examines the network message to determine whether the network message is a flight phase message. If the message is not a flight phase message, the system labels the network message with the current flight phase at step 315. In some embodiments, such current flight phase may have been determined in step 303. As previously described, in various embodiments, each network message may be associated with a flight phase, including, but not limited to, pre-flight; engine start; in-gate; taxi-out; takeoff; initial climb; climb; enroute cruise; descent; approach land; rollout; taxi-in; go around; and engine shutdown. In some instances, the current flight phase message may be unknown. If the message is a flight phase message, the system identifies the current flight phase, at step 311, and creates a current flight phase label for the identified flight phase at step 313. The system then returns to step 305 to parse for and examine a subsequent network message. If the subsequent network message parsed and examined at step 305 is not a flight phase message, such network message is labeled at step 315 with the current phase label created at step 313.

The network message is further examined to determine if it contains a new function at step 317 and labeled with a function label at step 321. The label may be a new function label or a previously determined function label. If the network message contains a new function, a new function label is created at step 319 and the network message is labeled with the determined function label at step 321. If the network message does not contain a new function, the network message may be labeled at step 321 with a previously determined function label.

The network message is further examined to determine if it contains a new sub-function at step 323 and labeled with a sub-function label at step 327. The label may be a new sub-function label or a previously determined sub-function label. If the network message contains a new sub-function, a new sub-function label is created at step 325 and the network message is labeled with the determined sub-function label at step 327. If the network message does not contain a new sub-function, the network message may be labeled at step 327 with a previously determined sub-function label.

The network message is further examined to determine if it contains a new data flow at step 329 and labeled with a data flow label at step 333. The label may be a new data flow label or a previously determined data flow label. If the network message contains a new data flow, a new data flow label is created at step 331 and the network message is labeled with the determined data flow label at step 333. If the network message does not contain a new data flow, the network message may be labeled at step 333 with a previously determined data flow label.

The network message is further examined to determine if it contains a new protocol at step 335 and labeled with a protocol label at step 339. The label may be a new protocol label or a previously determined protocol label. If the network message contains a new protocol, a new protocol label is created at step 337 and the network message is labeled with the determined protocol label at step 339. If the network message does not contain a new protocol, the network message may be labeled at step 339 with a previously determined protocol label.

Once the above attributes have been identified and labeled, the functional network flow corresponding to the network message or messages is examined to determine if it is a unique functional network flow at step 341. If the functional network flow is determined to be unique, the unique network flow is added to a functional network flow table, as depicted in Table 1 below. In some embodiments, the functional network flow table contains previously defined and/or identified network flows at step 343. In some embodiments, the uniqueness of the network flow may be determined by evaluating the network flow against the network flows within the functional network flow table. In some embodiments, the functional network flow table may be organized by the determined flight phase of each network flow. In other embodiments, the network flow table may be organized based on other attributes and/or characteristics. An example of a functional network flow table is shown as Table 1.

TABLE 1

Example Functional Network Flow Table.

| # | Flight Phase | Function | Sub-Function | Dataflow | Protocol | Message |
|---|---|---|---|---|---|---|
| 1 | Unknown | Function001 | subF001 | Dataflow001 | N/A | SRC ADDR1 DST ADDR3 PORT A: MSG1 |

TABLE 1-continued

Example Functional Network Flow Table.

| # | Flight Phase | Function | Sub-Function | Dataflow | Protocol | Message |
|---|---|---|---|---|---|---|
| 2 | Power-On | Function001 | subF001 | Dataflow002 | N/A | SRC ADDR1 DST ADDR3 PORT A: MSG2 |
| 3 | Preflight | Function002 | subF001 | Dataflow001 | N/A | SRC ADDR4 DST ADDR2 PORT A: MSG1 |
| 4 | Preflight | Function002 | subF001 | Dataflow002 | N/A | SRC ADDR2 DST ADDR4 PORT A: MSG1 |
| 5 | Preflight | Function002 | subF001 | Dataflow003 | N/A | SRC ADDR4 DST ADDR2 PORT B: MSG2 |
| 6 | Preflight | Function002 | subF002 | Dataflow001 | N/A | SRC ADDR2 DST ADDR3 PORT C: MSG1 |
| 7 | Preflight | Function002 | subF002 | Dataflow002 | N/A | SRC ADDR3 DST ADDR2 PORT C: MSG1 |
| 8 | Preflight | Function002 | subF002 | Dataflow003 | TFTP protocol | SRC ADDR2 DST ADDR3 PORT A: MSG2 |
| 9 | Preflight | Function002 | subF002 | Dataflow004 | N/A | SRC ADDR2 DST ADDR3 PORT A: MSG2 |
| 10 | Preflight | Function003 | subF001 | Dataflow001 | N/A | SRC ADDR2 DST ADDR5 PORT A: MSG1 |
| 11 | Preflight | Function003 | subF001 | Dataflow002 | N/A | SRC ADDR2 DST ADDR5 PORT A: MSG2 |
| 12 | Preflight | Function004 | subF001 | Dataflow001 | N/A | SRC ADDR1 DST ADDR3 PORT A: MSG3 |
| 13 | Preflight | Function004 | subF001 | Dataflow002 | N/A | SRC ADDR2 DST ADDR3 PORT A: MSG3 |
| 14 | Preflight | Function004 | subF002 | Dataflow001 | N/A | SRC ADDR3 DST ADDR1 PORT A: MSG2 |
| 15 | Taxi Out | Function001 | subF001 | Dataflow001 | N/A | SRC ADDR1 DST ADDR3 PORT A: MSG1 |
| 16 | Taxi Out | Function001 | subF001 | Dataflow002 | N/A | SRC ADDR1 DST ADDR3 PORT A: MSG2 |
| 17 | Take Off | Function001 | subF001 | Dataflow001 | N/A | SRC ADDR1 DST ADDR3 PORT A: MSG1 |
| 18 | Take Off | Function001 | subF001 | Dataflow002 | N/A | SRC ADDR1 DST ADDR3 PORT A: MSG2 |
| 19 | Initial Climb | Function001 | subF001 | Dataflow001 | N/A | SRC ADDR1 DST ADDR3 PORT A: MSG1 |

TABLE 1-continued

Example Functional Network Flow Table.

| # | Flight Phase | Function | Sub-Function | Dataflow | Protocol | Message |
|---|---|---|---|---|---|---|
| 20 | Initial Climb | Function001 | subF001 | Dataflow002 | N/A | SRC ADDR1 DST ADDR3 PORT A: MSG2 |
| 21 | Climb | Function001 | subF001 | Dataflow001 | N/A | SRC ADDR1 DST ADDR3 PORT A: MSG1 |
| 22 | Climb | Function001 | subF001 | Dataflow002 | N/A | SRC ADDR1 DST ADDR3 PORT A: MSG2 |
| 23 | EnRoute Cruise | Function001 | subF001 | Dataflow001 | N/A | SRC ADDR1 DST ADDR3 PORT A: MSG1 |
| 24 | EnRoute Cruise | Function001 | subF001 | Dataflow002 | N/A | SRC ADDR1 DST ADDR3 PORT A: MSG2 |
| 25 | Descent | Function001 | subF001 | Dataflow001 | N/A | SRC ADDR1 DST ADDR3 PORT A: MSG1 |
| 26 | Descent | Function001 | subF001 | Dataflow002 | N/A | SRC ADDR1 DST ADDR3 PORT A: MSG2 |
| 27 | Approach/ Landing | Function001 | subF001 | Dataflow001 | N/A | SRC ADDR1 DST ADDR3 PORT A: MSG1 |
| 28 | Approach/ Landing | Function001 | subF001 | Dataflow002 | N/A | SRC ADDR1 DST ADDR3 PORT A: MSG2 |
| 29 | Rollout | Function001 | subF001 | Dataflow001 | N/A | SRC ADDR1 DST ADDR3 PORT A: MSG1 |
| 30 | Rollout | Function001 | subF001 | Dataflow002 | N/A | SRC ADDR1 DST ADDR3 PORT A: MSG2 |
| 31 | Taxi In | Function001 | subF001 | Dataflow001 | N/A | SRC ADDR1 DST ADDR3 PORT A: MSG2 |
| 32 | Taxi In | Function001 | subF001 | Dataflow002 | N/A | SRC ADDR1 DST ADDR3 PORT A: MSG2 |
| 33 | Engine Shutdown | Function001 | subF001 | Dataflow001 | N/A | SRC ADDR1 DST ADDR3 PORT A: MSG1 |
| 34 | Engine Shutdown | Function001 | subF001 | Dataflow002 | N/A | SRC ADDR1 DST ADDR3 PORT A: MSG2 |

Table 1 shows an example table containing 34 functional network flows corresponding to network messages that have been examined and labeled. The attributes of the functional network flows in Table 1 have not been classified. Functional network flow 1 includes an unknown flight phase because the system may have initialized as unknown at step 301. However, functional network flow 2 includes a flight phase label corresponding to the power-on flight phase, while functional network flows 3 to 14 include a flight phase label corresponding to the preflight flight phase. Functional network flows 15 and 16 correspond to a Taxi Out flight phase. Functional network flows 17 and 18 correspond to a Take Off flight phase. Functional network flows 19 and 20 correspond to an Initial Climb flight phase. Functional network flows 21 and 22 correspond to a Climb flight phase. Functional network flows 23 and 24 correspond to an Enroute Cruise flight phase. Functional network flows 25 and 26 correspond to a Descent flight phase. Functional network flows 27 and 28 correspond to an Approach Landing flight phase. Functional network flows 29 and 30 correspond to a Roll Out flight phase. Functional network flows 31 and 32 correspond to a Taxi In flight phase. Functional network flows 33 and 34 correspond to an Engine Shutdown flight phase.

As shown in Table 1, the various attributes of each network flow has been labeled, but remain unclassified. Four different functions were identified and labeled: Function 001 (functional network flows 1, 2, 15 through 34), Function 002 (functional network flows 3 through 9). Function 003 (functional network flows 7 and 8), and Function 004 (functional network flows 12 through 14). One sub-function was determined for Function 001: subF 001, two sub-functions were determined for Function 002: subF 001 and subF 002, one sub-function for Function 003: subF 001, and two sub-functions were determined for Function 004: subF 001 and subF 002. Additionally, two data flows were determined for Function 001, three data flows were determined for Function 002, two data flows were determined for Function 003, and two data flows were determined for Function 004. Many of the functional network flows do not include identifiable protocols. However, the packet analyzer tool is able to identify and classify standard COTS protocols, protocols may be classified before classification in steps 347 and 353 (described below). For example, in Table 1, functional network flow 8 includes a Trivial File Transfer Protocol (TFTP), while the remaining attributes remain unclassified.

Whether there are more network messages to parse and identify into functional network flows is determined at step 345. If there are more network messages to identify and/or define, the system parses remaining network packets into further network messages at step 305. If all network messages have been identified and/or defined, a knowledge base is used to classify the functional network flows at step 347. In some embodiments, the knowledge base is in a computer readable format. The attributes of the functional network flows (including function, sub-function, data flow, and/or protocol) are classified at step 347. In some embodiments, the system may automatically classify the functional network flows utilizing the machine readable knowledge base. In some embodiments, the system may classify the various attributes based on previous user input. In other embodiments, the system may prompt a user to select a classification from a list of classifications for one or more attributes. In some embodiments, the list of classified attributes and/or network messages may be ranked based on various algorithms, matching scores, user input, and/or third party input. Additionally, or alternatively, the system may prompt a user for input to classify one or more attributes. In some embodiments, the system may classify one or more attributes by retrieving matching and/or similar network messages that include one or more classified attributes from various databases, including local storage and global databases. In some embodiments, databases may include network messages classified based on previous user input and/or third party input. In some embodiments, the user may be a subject matter expert (SME) in the loop.

An example of a classified functional network flow table is shown as Table 2 below. In some embodiments, the function, sub-function, data flow, and protocol of a network message may categorize the functional network flow carried by the network message and/or an action initiated by the network message. In some embodiments, the function, sub-function, and data flow of a network message may categorize the message carried by the network message and/or an action initiated by the network message. For example, functions of a network message may include wireless dataload, central maintenance and computing functions (CMCF), printing jobs, etc. Other functional flows of major aircraft functions, may further include flight management, thrust management, and/or aircraft condition monitoring. Such functional flows may contain sub-functions, which can also be described as different data flows. In various embodiments, the sub-function of a network message may be a particular implementation of the function of the network message. For example a wireless dataload function may include sub-functions such as IEEE 802.1x, 615A, Config Report, Print Request, etc.

In some embodiments, the data flow of a network message may describe the specific action initiated by the network message. In some embodiments, the data flow may be either temporal or protocol exchange. For example, functional flows including wireless dataload and printing jobs are protocol exchanges. Central maintenance computing functions may include both temporal and protocol exchange data flows. For example, a continuous build in test equipment (BITE) reporting, which does not establish a session is a temporal data flow. Similarly, a functional status that is posted from the established member system list is a temporal data flow. Another temporal data flow may be functions that queue for data from the established member system list. However, a query of LRU status from CMCF is a protocol data flow. A protocol exchange data flow allows for generation of context aware filter rules based on the order the exchanges occur.

At 349, the classified functional network flows are reviewed to determine if the functional network flow appears in different flight phases. Functional network flows which appear in different flight phases are grouped together into a signal network flow at step 351. For example, as shown in Table 2, the FMC function of airspeed and altitude are available in all phases of flight. Such functional network flows may be grouped together in the functional network flow table, such as Table 2. For this functional flow there is no flight phase context restriction which you would put in the firewall filter rules. In some embodiments, such network flows may be grouped in a functional network flow table, such as Table 2 below.

At step 353, the automatic classifications of the functional network flow from step 347 are validated and verified. In some embodiments, a subject matter expert (SME) validates and verifies the automatic classifications. In some embodiments, the SME validates and verifies the grouping (from step 351) of functional network flows that appear in different flight phases. In some embodiments, the SME may utilize IDC and other knowledge to validate and verify the automatic classifications. If any attributes of the functional network flow was not automatically classified at step 347, the SME may perform a manual classification of the unclassified attributes. In some embodiments, there may be tens of LRUs systems and thousands of network messages to classify into functional network flows. Initially, much of the classification may be manual. In some embodiments, the functional network flow table may be organized by function, sub function, data flow and protocol in order to allow the SME to be able to focus on one function type at a time. The output of the SME validation, verification and manual classification is shown in Table 2. In this manner, Table 2 information may be a knowledge base for generation of the filter rules.

TABLE 2

Example Classified Functional Network Flow Table.

| # | Flight Phase | Function | Sub-Function | Data flow | Protocol | Message |
|---|---|---|---|---|---|---|
| 1 | Unknown | FMC | Airdata | Altitude | N/A | SRC ADDR1 DST ADDR3 PORT A: MSG1 |
| 2 | Power-On | FMC | Airdata | Airspeed | N/A | SRC ADDR1 DST ADDR3 PORT A: MSG2 |
| 3 | Preflight | Dataload | IEEE 802.1x | ML Authentication Request | N/A | SRC ADDR4 DST ADDR2 PORT A MSG1 |
| 4 | Preflight | Dataload | IEEE 802.1x | ML Authentication Granted | N/A | SRC ADDR2 DST ADDR4 PORT A MSG1 |
| 5 | Preflight | Dataload | IEEE 802.1x | ML Authorization Request | N/A | SRC ADDR4 DST ADDR2 PORT B MSG2 |
| 6 | Preflight | Dataload | 615A | Establish Session Request | N/A | SRC ADDR2 DST ADDR3 PORT C MSG1 |
| 7 | Preflight | Dataload | 615A | Establish Session Grant | N/A | SRC ADDR3 DST ADDR2 PORT C MSG1 |
| 8 | Preflight | Dataload | 615A | Transfer Data | TFTP protocol | SRC ADDR2 DST ADDR3 PORT A: MSG2 |
| 9 | Preflight | Dataload | 615A | Close Session | N/A | SRC ADDR2 DST ADDR3 PORT A: MSG2 |
| 10 | Preflight | Printing | Print Request | Establish Session | N/A | SRC ADDR2 DST ADDR5 PORT A: MSG1 |
| 11 | Preflight | Printing | Print Request | Print | N/A | SRC ADDR2 DST ADDR5 PORT A: MSG2 |
| 12 | Preflight | CMCF | BITE Rpt | Send Report | N/A | SRC ADDR1 DST ADDR3 PORT A: MSG3 |
| 13 | Preflight | CMCF | BITE Rpt | Send Report | N/A | SRC ADDR2 DST ADDR3 PORT A: MSG3 |
| 14 | Preflight | CMCF | Config Report | Request Report | N/A | SRC ADDR3 DST ADDR1 PORT A: MSG2 |
| 15 | Taxi Out | FMC | Airdata | Altitude | N/A | SRC ADDR1 DST ADDR3 PORT A: MSG1 |
| 16 | Taxi Out | FMC | Airdata | Airspeed | N/A | SRC ADDR1 DST ADDR3 PORT A: MSG2 |
| 17 | TakeOff | FMC | Airdata | Altitude | N/A | SRC ADDR1 DST ADDR3 PORT A: MSG1 |
| 18 | TakeOff | FMC | Airdata | Airspeed | N/A | SRC ADDR1 DST ADDR3 PORT A: MSG2 |

TABLE 2-continued

Example Classified Functional Network Flow Table.

| # | Flight Phase | Function | Sub-Function | Data flow | Protocol | Message |
|---|---|---|---|---|---|---|
| 19 | Initial Climb | FMC | Airdata | Altitude | N/A | SRC ADDR1 DST ADDR3 PORT A: MSG1 |
| 20 | Initial Climb | FMC | Airdata | Airspeed | N/A | SRC ADDR1 DST ADDR3 PORT A: MSG2 |
| 21 | Climb | FMC | Airdata | Altitude | N/A | SRC ADDR1 DST ADDR3 PORT A: MSG1 |
| 22 | Climb | FMC | Airdata | Airspeed | N/A | SRC ADDR1 DST ADDR3 PORT A: MSG2 |
| 23 | EnRoute Cruise | FMC | Airdata | Altitude | N/A | SRC ADDR1 DST ADDR3 PORT A: MSG1 |
| 24 | EnRoute Cruise | FMC | Airdata | Airspeed | N/A | SRC ADDR1 DST ADDR3 PORT A: MSG2 |
| 25 | Descent | FMC | Airdata | Altitude | N/A | SRC ADDR1 DST ADDR3 PORT A: MSG1 |
| 26 | Descent | FMC | Airdata | Airspeed | N/A | SRC ADDR1 DST ADDR3 PORT A: MSG2 |
| 27 | Approach/ Landing | FMC | Airdata | Altitude | N/A | SRC ADDR1 DST ADDR3 PORT A: MSG1 |
| 28 | Approach/ Landing | FMC | Airdata | Airspeed | N/A | SRC ADDR1 DST ADDR3 PORT A: MSG2 |
| 29 | Rollout | FMC | Airdata | Altitude | N/A | SRC ADDR1 DST ADDR3 PORT A: MSG1 |
| 30 | Rollout | FMC | Airdata | Airspeed | N/A | SRC ADDR1 DST ADDR3 PORT A: MSG2 |
| 31 | Taxi In | FMC | Airdata | Altitude | N/A | SRC ADDR1 DST ADDR3 PORT A: MSG1 |
| 32 | Taxi In | FMC | Airdata | Airspeed | N/A | SRC ADDR1 DST ADDR3 PORT A: MSG2 |
| 33 | Engine Shutdown | FMC | Airdata | Altitude | N/A | SRC ADDR1 DST ADDR3 PORT A: MSG1 |
| 34 | Engine Shutdown | FMC | Airdata | Airspeed | N/A | SRC ADDR1 DST ADDR3 PORT A: MSG2 |

Table 2 includes the same functional network flows from Table 1 with attributes classified. As shown in Table 2, Function 001 may be classified as FMC (flight management computer), such as for functional network flows 1, 2, and 15 to 34. The FMC, such as FMC 120 shown in FIG. 1B, is a specialized computer system that automates a wide variety of in-flight tasks, reducing the workload on the flight crew. A primary function of the FMC is in-flight management of the flight plan. Using various sensors, such as a GPS and an inertial navigation system (INS) often backed up by radio navigation, to determine the aircraft's position, the FMS can guide the aircraft along the flight plan. These functional network flows further include an altitude data flow (Data flow001) and an airspeed data flow (Data flow002), which may indicate the altitude and airspeed of an aircraft, respectively. Such data flows are sent from source address 1, corresponding to the flight management computer (FMC) 120, to a destination source 3, corresponding to a central maintenance computer (CMC) 124.

As another example, Function002 of functional network flows 3 through 9 are classified as a Dataload function. As previously described, data loading functions may be maintenance actions only allowed in maintenance mode when the aircraft is on the ground, such as during the in-gate flight phase and/or taxi-out flight phase. In some embodiments, a wireless dataload function may include operations to exchange data files between loadable targets. Such operations may include discovery of available loadable targets on a network, querying current configurations of loadable targets, loading new or updated software and configuration files to loadable targets, downloading data files from loadable targets, etc.

Sub-function SubF001 of the Dataload function (Function 001) has been classified as IEEE 802.1x. The IEEE 802.1x standard for port-based network access control (PNAC) defines the encapsulation of the extensible authentication protocol (EAP) over IEEE 802, also known as EAP over LAN (EAPOL). For example, functional network flows 3, 4, and 5 include IEEE 802.1x sub-functions. As further depicted in Table 2, Data flow001 of functional network flow 3 has been classified as an ML Authentication Request from source address 4, corresponding to maintenance laptop (ML) 126 to destination address 2, corresponding to On-Board Network System (ONS) 122. Data flow02 of functional network flow 4 has been classified as an ML Authorization Grant from ONS 122 to ML 126, to initiate a wireless dataload. Data flow03 of functional network flow 5 has been classified as an ML Authorization Request from ML 126 to ONS 122 to an additional Port B at ONS 122.

In other embodiments, the sub-function of a network message for a wireless dataload function may be the ARINC 615A standard, which is used for data loading operations on aircraft over various types of networks, such as Ethernet, Controller Area Network (CAN), and/or ARINC 664. In some embodiments, software utilizing the 615A standard may perform uploads, batch uploads, downloads, search, and information data loading operations for one or more targets. For example, Functional network flows 6 to 9 in Table 2 include 615A classification for sub-function SubF002 of the Dataload function. Functional network flow 6 further includes a classification of Establish Session Request data flow for Data flow001, which may initiate an interactive information interchange between devices, such as systems 110 and 114, in certain embodiments. The Establish Session Request is sent from source address 2, corresponding to ONS 122, to destination address 3, corresponding to CMC 124. Functional network flow 7 includes a classification of Establish Session Grant data flow for Data flow002 sent from CMC 124 to ONS 122. Functional Network flow 8 further includes a classification of Transfer Data data flow for Data flow003, which may initiate downloading and/or uploading of data between the ONS 122 and CMC 124 devices. In some embodiments, such downloading and/or uploading may utilize TFTP and the protocol of functional network flow 8 is classified as such. In other embodiments, other protocols may be implemented in wireless dataload operations. Subsequently, Data flow003 of functional network flow 9 may be classified as a Close Session request, which may end the interactive information interchange between the ONS 122 and CMC 124 devices after data has been completely downloaded and/or uploaded between devices, in certain embodiments.

As another example, the function of a message may be classified as Printing, such as for Function 003 of functional network flows 10 and 11 in Table 2. As shown in Table 2, functional network flows 10 and 11 further include Print Request classifications for sub-function SubF 001, and may be messages requesting a printout of the dataload established through functional network flows 6 to 9, in certain embodiments. Functional Network flow 10 includes Establish Session data flow classification for Data flow001, which may initiate an interactive information interchange between devices, such as ONS 122 and printer 130. Functional Network flow 11 includes a Print data flow classification for Data flow002, which may initiate printing of the report, at printer 130.

As another example, the function of a message may be a central maintenance control function (CMCF). As depicted in Table 2, the Function004 of functional network flows 12 to 14 may be classified as CMCF, which may indicate a maintenance report request. In certain embodiments, a central maintenance control function may initiate and/or receive communication with an aircraft's onboard maintenance system in order to isolate faults and guide appropriate maintenance actions through centralized fault reporting. In some embodiments, a CMCF may also allow fault report consolidation, message association and flight deck effect (FDE) correlation. AS depicted in Table 2, function network flow 12 and 13 further include a BITE Report Sub-function for SubF001. BITE (built-in test equipment) is characterized primarily as a passive fault management and diagnosis built into airborne systems to support the maintenance process. Built-in test equipment may refer to multimeters, oscilloscopes, discharge probes, and frequency generators that are provided as part of the system to enable testing and perform diagnostics. Functional network flow 12 includes a Send Report Data flow from FMC 120 to CMC 124 providing a diagnostic of the flight management computer. Similarly, functional network flow 13 includes a Send Report Data flow from ONS 122 to CMC 124 providing a diagnostic of the On-Board Network System. As further depicted in Table 2, functional network flow 14 also includes a Config Report classification for its sub-function SubF002 and a Request Report data flow classification for Data flow001, which may correspond to a request for a maintenance report from the CMC 124 to the FMC 120.

In various embodiments, various other types of network messages and/or flows may be transmitted on-board and/or off-board over an e-Enabled platform during the different flight phases. For example, the pre-flight phase may include any activity involved with preparing the aircraft for departure, during which the crew must determine the airworthiness of the aircraft and address any open issues before departure. In some embodiments, the aircraft may have extensive autoflight capabilities that allow many of the navigation and performance optimization tasks to be handled automatically if desired. Autoflight initialization and Flight Management System (FMS) programming may be conducted during the pre-flight phase. In various embodiments, the required flight parameters are selected or programmed in the system during the pre-flight phase. Some airlines have information systems which allow information required to initialize the autoflight systems to be uploaded automatically via an ACARS (Aircraft Communication and Reporting System) datalink unit. ACARS typically utilizes a VHF datalink and alphanumeric interface to facilitate company-specific communications between the aircraft and a central Airline Operations Center (AOC).

During the pre-departure flight phase, the Captain, lead gate agent and ground crew chief coordinate their efforts to see that all pre-departure requirements are met, as the scheduled departure time approaches. The pilots may finalize the FMS and autoflight parameters by obtaining an update on weather conditions and runway utilization through the Airport Terminal Information Service (ATIS). In addition, the crew must receive confirmation of the flight's routing from ATC. Prior to the scheduled departure (usually at least a few hours before), the airline's dispatch office files a requested routing based on their flight plan optimization with ATC. Approximately 20 minutes prior to departure, the ATC route clearance is requested, preferably through the ACARS Pre-Departure Clearance (PDC) function. The ATC route clearance received by the crew may differ from the filed routing and the changes must be addressed (fuel/performance/dispatch considerations) and reprogrammed.

In addition to possible routing changes, ATC may also adjust the planned departure time as a result of current airspace dynamics. The ATC clearance may include a "gate hold" or expected "wheels-up" time due to traffic congestion, routing conflicts, or adverse weather conditions. In order to prepare the aircraft for movement, the ground crew completes the baggage and cargo loading, including late bags, and closes the cargo doors. Typically, the Captain communicates to the tug driver (or other ground crewmember) through an "interphone" link, while the First Officer communicates to ramp control and/or ATC via the VHF radio.

Anytime ground movement is initiated, permission must be received from the controlling authority, such as in the taxi-out phase. At some point before leaving the ramp area, the First Officer contacts ground control to get taxi clearance to the active runway. Operational considerations such as high take-off weight, may dictate the request for a special runway which can result in a taxi and/or take-off delay while ATC works out a modified sequence. During the taxi, the load closeout is received via ACARS or by VHF radio. In situations where there will be a long taxi due to numerous departures ahead in sequence for take-off, the Captain may make a PA announcement informing the passengers and cabin crew of his/her best estimate of the length of the delay. If the delay is significant, the company may have to be updated via ACARS or VHF radio with a new ETO (estimated time "OFF"). As the aircraft approaches the departure end of the runway, the Captain may make a departure PA announcement to inform the flight attendants that the take-off is imminent and they should secure themselves at their stations. A passenger briefing (video) may also be shown.

In various embodiments, network messages during the takeoff phase may include various communications from the control tower to the aircraft. For example, in order to make most efficient use of runway resources, the local tower controller often issues a "position and hold" clearance to an aircraft in preparation for final take-off clearance in order to allow the aircraft to taxi into position and hold on the departure runway while waiting for other traffic, runway restrictions, or an ATC (air traffic control) issued departure time. Alternatively, if this hold time is not required or a departure needs to be expedited, the tower may clear the flight for take-off without holding in position. As another example, adequate wake separation requirements must be assured by confirming that an acceptable interval of time has elapsed before commencing the take-off roll if the flight is following the departure of a large aircraft.

An uneventful take-off is typically followed by the climb phase. A normal initial climb-out includes "cleaning up" the aircraft (gear raised, flaps/slats retracted) while conforming to any noise and/or obstacle requirements. The dynamics of the flight environment, including accommodation of ATC directives, require the crew to continuously monitor aircraft performance in order to realize the best possible flight profile. At some point during the climb, the cockpit crew checks the FMS and/or performance charts to compare the optimal and maximum cruise altitudes with the planned data and desired cruise Mach. This information is used to coordinate an optimal cruise altitude with ATC. Other factors include wind data and ride (turbulence) conditions, en-route convective weather, Minimum Equipment List (MEL) contingencies, traffic-induced speed restrictions and fuel consumption issues. Passenger-related activities during the climb may include beginning the meal and/or beverage service, delivering any marketing PA announcements and activating any entertainment systems. In addition, the Captain usually makes a PA describing en-route flight time and weather conditions, points of interest, arrival estimate, destination weather and, if applicable, any information concerning the presence of an augmented crew and/or safety information.

In some embodiments, as cruise altitude is reached during the enroute cruise phase, the power settings and/or Mach target may be established, and the crews will report level to ATC. The crew also performs various administrative duties, including downlinking any departure delay ACARS codes and recording the engine monitor log (if not automated). The aircraft is usually equipped with at least 2 VHF transceivers and, if overwater certified, HF radios. VHF radio management usually requires one tuner to be set to the current ATC frequency, while the other is utilized for company communications or to maintain a listening watch on the universal emergency channel (121.5 MHz). Satellite communications (SATCOM) may be used where available for both ATC and company communications. SATCOM systems offer the benefit of worldwide communication coverage without the signal degradation, time-of-day variability, and other deficiencies associated with HF. In addition, when out of VHF contact with ground facilities, the crew typically maintains a listening watch on the air-to-air frequency of 123.45 MHz. This channel may be used to pass along operational information such as ride reports and en-route weather directly between aircraft.

In other embodiments, the sources of information available for cruise level decision making include Pilot Reports (PIREP) from other flights, ATC, the crew's own experience, dispatch, and the flight plan. On international flights, transitioning through airspace boundaries under the jurisdiction of other national sovereignties may require supplementary procedures to address local restrictions. These FIR (Flight Information Region) boundaries normally require advance notification via the flight planning process (filed flight plan), and preliminary contact by the aircraft as the flight approaches the boundary. Generally, separate ATC clearances must be issued at each boundary crossing, including entering the oceanic airspace.

The need to deviate from the desired track due to adverse weather is always a possibility. Convective weather and thunderstorms may require deviations from planned routings, but this is facilitated through coordination with ATC in this VHF/radar environment. As in other phases of flight, the crew must be constantly prepared for the possibility of contingencies requiring diversion of the aircraft to an en-route alternate airport. In addition to the possible closure of the destination airport (due to weather, power outages, or other field situations), reasons for diverting include medical emergencies (sick passengers/crew), aircraft equipment problems, terrorist activities inflight, unacceptable holding times, fuel diversion due to wind or traffic delays.

During the descent phase, the initial descent may take place with about 30 to 40 minutes remaining in the flight, at which time the crew begins their approach and landing preparations. An "In Range" message is often transmitted to the destination station either through ACARS or by VHF radio. This message includes the latest touchdown estimate, special passenger requests (wheelchairs/connections), and if not already transmitted, any maintenance discrepancies. The station transmits or uplinks the arrival gate assignment, ground power unit status and any other relevant status message such as a "tow-in only" requirement for the assigned gate. During the descent, ATC may issue crossing restrictions which can be part of a published standard arrival procedure, such as a Standard Terminal Arrival Route (STAR), or as a response to a traffic sequencing requirement. The FMS is the primary resource available to the crew for descent planning as restrictions can be programmed directly via the CDU and a profile calculated.

Destination weather and the expected approach/runway procedures are major considerations in planning the arrival. The primary source of this information is the Airport Terminal Information System (ATIS), although holding delays, weather conditions and runway operations may be passed along via ATC and/or dispatch. ATIS provides the current weather, instrument approach procedures in use, and active runways, as well as details concerning runway and taxiway closures, windshear reports, precise visibility values for individual runways, braking capability, bird activity, temporary obstructions (e.g. construction), land and hold short operations (LAHSO) utilization and any other relevant safety-related information.

The aircraft operated by most air carriers are usually equipped to satisfy the navigation requirements of a variety of approach procedures for the approach phase. Precision approaches include Global Positioning System (GPS) autoland, GPS LNAV/VNAV and Category (CAT) I, II and III ILS approaches as previously described. Many runways at larger airports utilize the Instrument Landing System (ILS) to provide guidance to pilots during instrument conditions along a well-defined path made up of lateral and vertical elements called the localizer and glide slope respectively. A non-precision approach is a procedure where lateral track information is provided by a local navigation aid (navaid) or satellite, but vertical guidance is received through barometric referencing or other means not directly associated with the specific runway. As expected, precision approaches provide for operations in much lower ceiling and visibility conditions.

In the event the requirements for completing the approach and landing are not satisfied, the go-around phase may be executed and a standardized "missed approach procedure" and/or ATC instructions must be followed. Options available following a missed approach include entering holding to wait out whatever unacceptable condition resulted in the aborted landing, diverting to an alternate airport, or most commonly, accepting ATC vectors to initiate another approach. Many aborted landings are initiated by ATC or the cockpit crew due to traffic on the runway. In most cases a prior arrival failed to clear the runway in a timely manner, but a delayed take-off by an aircraft sitting in position at the threshold can also result in an aborted landing.

After touching down on the runway, during the landing and/or rollout phase, the pilot uses reverse thrust, ground spoilers, and wheel braking to decelerate to taxi-speed and vacate the runway. After exiting the runway, the First Officer may contact ground control for taxi-in instructions, completes the after landing-taxi checklist and calls the local ramp control to confirm the arrival gate assignment and occupancy status. During the taxi-in phase, the pilots may use taxiway charts of the destination airport to assist in the execution of taxi clearances given to them by ATC. If the arrival gate is occupied, the aircraft may be required to wait out the delay at a remote location. Occupied gates are often the result of a delayed departure or other operational issues with the aircraft currently positioned at the gate and the anticipated delay should be passed on to ATC and the passengers. Some stations utilize automatic parking systems which employ an arrangement of lights and/or signs that the Captain uses for lead-in line and stopping position guidance.

At step 355, the knowledge base is updated. In various embodiments, the SME inputs are captured in a machine readable knowledge base (the data shown in Table 2) to be used by the automatic classification function at step 347. In some embodiments, a classification file is created from the SME inputs and stored in the machine readable knowledge base. Such classification file allows for automatic classification of functional network flows. As more and more functional network flows are verified, validated, and classified at step 353, the ability of the machine readable knowledge base to automatically classify network flows at step 347 increases, resulting in fewer unclassified functional network flows requiring manual classification at step 353.

The updated knowledge base containing classified flows can then be used to automatically generate discretionary access control (DAC) rules at step 357. In some embodiments, as each functional network flow is classified at step 347 and/or 353, a DAC rule is generated for each classified functional network flow. In some embodiments, filter rules may be generated in step 357 after all functional network flows have been classified, either automatically (at step 347) or manually (at step 353). In some embodiments, each DAC rule is based on a classified functional network flow. For example, the source in address, destination IP address, and protocol of a functional network flow may be used to generate DAC rules, such as Iptables rules. At step 359, the system determines whether there are subsequent functional network flows. In some embodiments, step 359 occurs after each filter rule corresponding to a functional network flow is generated at step 357. If there are other functional network flows remaining in the functional network flow table (Table 2) after generation of a DAC rule, the system returns to step 357 to generate a DAC rule corresponding to remaining subsequent functional network flow until there are no more function network flows remaining. When the generated DAC rule at step 357 corresponds to the last functional network flow of the functional network flow table, as determined at step 359, the method ends at 361.

In various embodiments, the types of filter rules generated are based on the operating system being used. In some embodiments, the DAC rules may be IPtables rules used in Linux tables. IPtables may refer to a user-space application program that allows a system administrator to configure the tables provided by the Linux kernel firewall (implemented as different Netfilter modules) and the chains and rules it stores. Different kernel modules and programs are currently used for different protocols; iptables applies to IPv4, ip6tables to IPv6, arptables to ARP, and ebtables to Ethernet frames. In some embodiments, other types of filter rules may be generated based on the classified functional network flows, such as ip6tables, arptables, and ebtables.

In some embodiments, each functional/data flow can generate IP filter rules for both the outbound and inbound filters. In some embodiments, these filters may be rich enough to address each functional/data flow distinctly. In some embodiments, a generated table, such as Table 2, may include entries corresponding to filter rules that are stateless. A firewall implementing stateless filter rules may treat each network frame or packet individually. Such packet filters operate at the OSI Network Layer (layer 3) and may function more efficiently because they only look at the header part of a packet. However, they do not keep track of the packet context such as the nature of the functional network flow, and thus, have no way of knowing if any given packet is part of an existing connection, is trying to establish a new connection, or is just a rogue packet.

In some embodiments, such IP filter rules can be extended to capture stateful behavior by chaining the simple IPtable rules, or stateless filter rules. For example, a sequence protocol diagram may be created at the sub-function level, such as 802.1x transactions. In various embodiments, the stateful IP filter rules can establish minimum and maximum bounds for rules that have a range of operating values, such as length of the packet, gross level IP Destination/Source (DA/SA) address space, Port DA/SA, etc. In some embodiments, such rules can be extended to a more targeted bound once the stateful behavior is taken into account where simple IP rules are chained. A firewall, such as firewall 112 may use stateful IP filter rules to track the operating state and characteristics of network connections traversing it, and may be able to hold significant attributes of each connection in memory. Such attributes may be collectively known as the state of the connection, and may include such details as the IP addresses and ports involved in the connection and the sequence numbers of the packets traversing the connection. In some embodiments, stateful inspection by a firewall may monitor incoming and outgoing packets over time, as well as the state of the connection, and stores the data in dynamic state tables. In some embodiments, such cumulative data is evaluated, so that filtering decisions would not only be based on administrator-defined rules, but also on context that has been built by previous connections as well as previous packets belonging to the same connection.

Figure 4A:
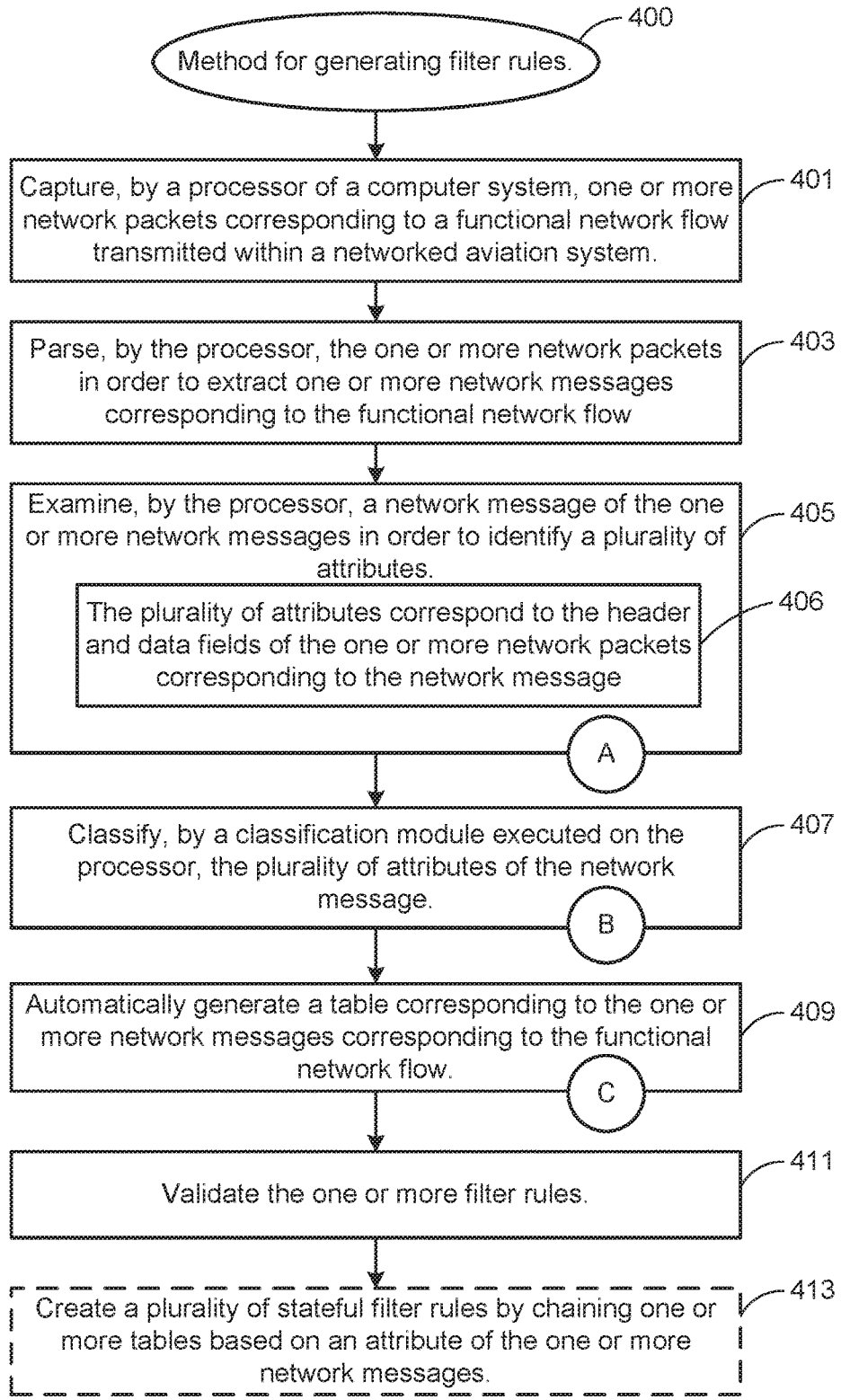
FIGS. 4A, 4B, and 4C illustrate another example of a method for automatic generation of filter rules, in accordance with one or more embodiments.
Figure 4B:
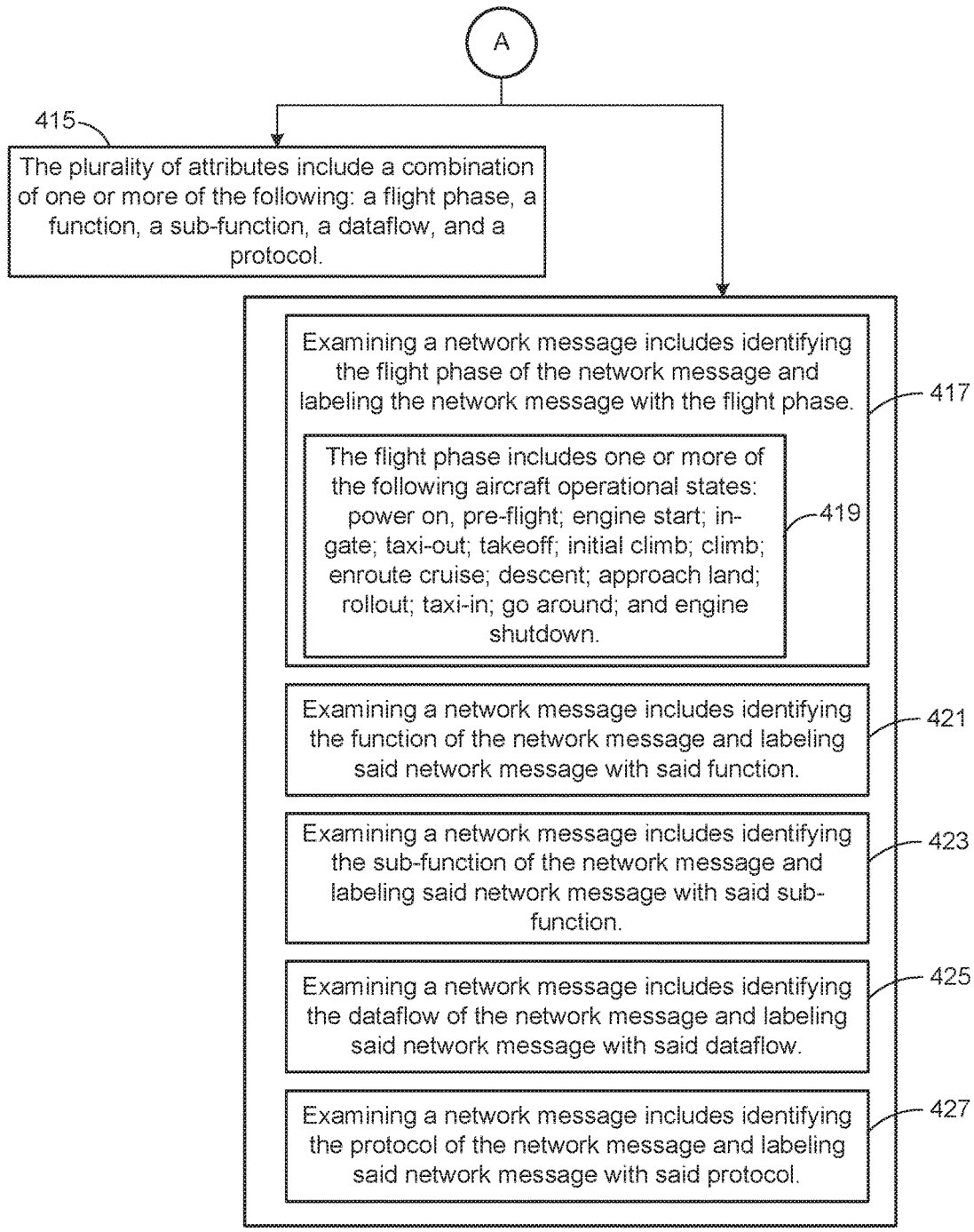
Figure 4C:
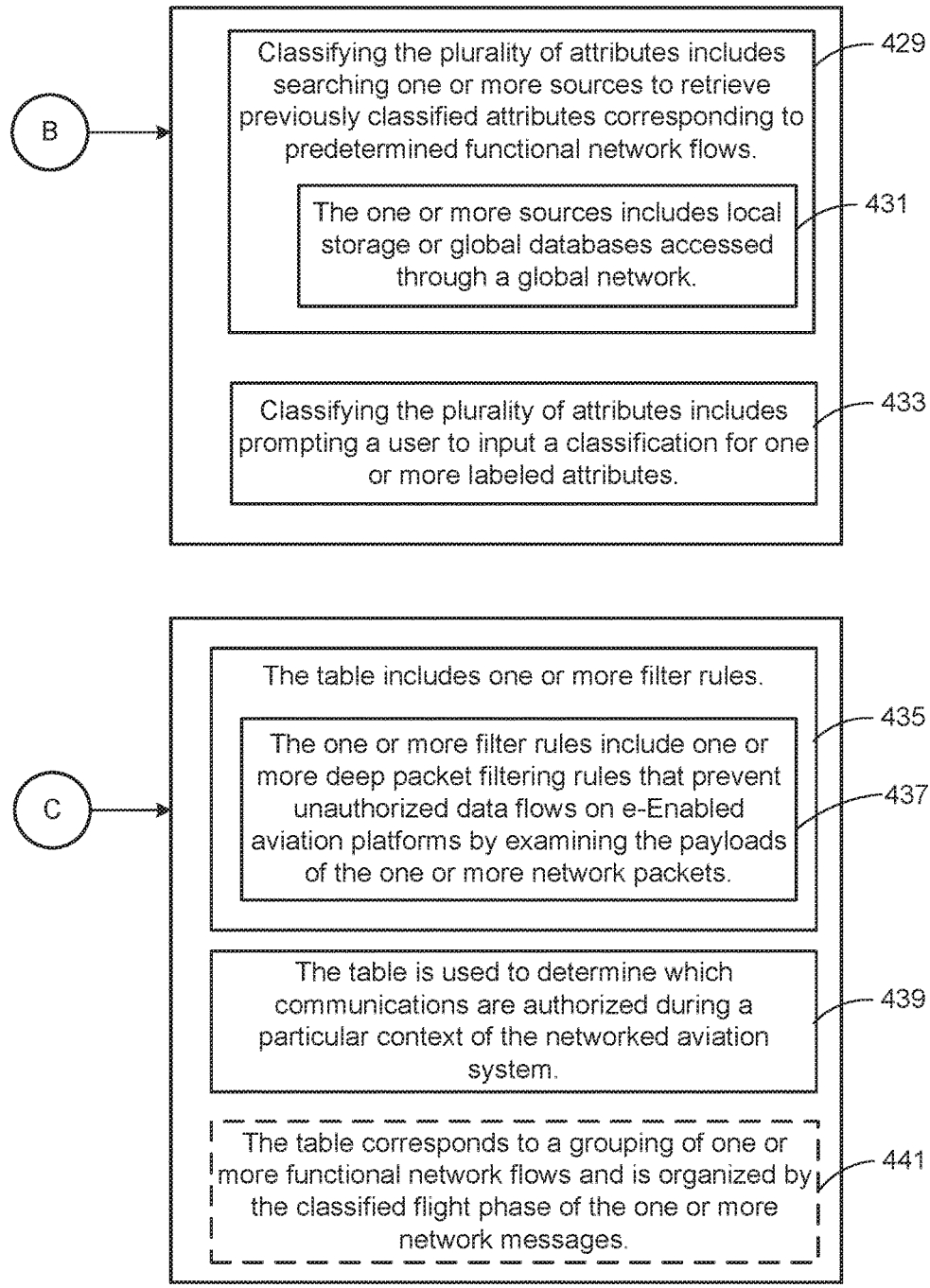

FIGS. 4A, 4B, and 4C illustrate an additional method 400 for automatically generating filter rules, in accordance with one or more embodiments. At step 401, one or more network packets corresponding to a functional network flow are captured, such as in step 301. In various embodiments, the functional network flow may be transmitted within a networked aviation system, such as system 200. In some embodiments, the network packets are captured by a processor of a computer system, such as processor 501 further described below. As previously described in step 301, network packets may be captured by a packet analyzer tool or other PCAP software. In various embodiments, a packet analyzer may be a computer program and/or piece of computer hardware that can intercept and log traffic that passes over a digital network or part of a network, such as network tap 118. In some embodiments, the packet analyzer may capture each packet, as data streams flow across the network, and decode the packet's raw data to show the values of various fields in the packet. In certain embodiments, network packets may be captured from different sources, such as system 110 and/or system 114 during unit bench testing of the line replaceable unit, during systems integration label testing, and/or during actual system flight test.

At step 403, the one or more network packets are parsed by a processor in order to extract one or more network messages corresponding to the functional network flow, such as in step 305. In some embodiments, as each part of the network packets are decoded by the packet analyzer tool, details, including network messages, within one or more packets may be decoded, arranged, and displayed. At step 405, a network message of the one or more network messages is examined in order to identify a plurality of attributes 415, as in step 307. In some embodiments, the network message may be examined by a processor utilizing the same and/or different packet analyzer tool from step 403. In some embodiments, the plurality of attributes 415 may correspond to the header and data fields 406 of the one or more network packets corresponding to the network message. In some embodiments, the plurality of attributes may include a combination of one or more of the following: a flight phase, a function, a sub-function, a data flow, and a protocol.

In further embodiments, examining the network message includes identifying the flight phase 417 of the network message and labeling the network message with the flight phase 417, as in steps 309 to 315. In some embodiments, the system may set to a current flight phase corresponding to one of flight phases upon identifying a light phase message. All subsequent messages will be labeled with the current flight phase until a subsequent flight phase message is identified. In various embodiments, the flight phase 417 may include one or more of the following operational states 419: power on, pre-flight; engine start; in-gate; taxi-out; takeoff; initial climb; climb; enroute cruise; descent; approach land; rollout; taxi-in; go around; and engine shutdown.

In some embodiments, examining a network message may also include identifying the function 421 of the network message and labeling the network message with the function 421, as in steps 317 to 321. In some embodiments, one or more functions 421 may be identified in a functional network flow. In some embodiments, an unclassified function label may be created upon identifying a new function 421. In some embodiments, an unclassified function label may be "Function001" as shown in Table 1. Subsequently identified functions 421 that are different may be numbered sequentially, such as "Function002," "Function003," and so on, such as in Table 1.

In some embodiments, examining a network message may also include identifying the sub-function 423 of the network message and labeling the network message with the sub-function 423, as in steps 323 to 327. In some embodiments, one or more sub-functions 423 may be identified in a functional network flow. In some embodiments, an unclassified sub-function label may be created upon identifying a new sub-function 423. In some embodiments, an unclassified sub-function label may be "subF001" as shown in Table 1. Subsequently identified sub-functions 423 that are different may be numbered sequentially, such as "subF002," "subF003," and so on, such as in Table 1.

In some embodiments, examining a network message may also include identifying the data flow 425 of the network message and labeling the network message with the data flow 425, as in steps 329 to 333. In some embodiments, one or more data flows 425 may be identified in a functional network flow. In some embodiments, an unclassified data flow label may be created upon identifying a new data flow 425. In some embodiments, an unclassified data flow label may be "Data flow001" as shown in Table 1. Subsequently identified data flows 425 that are different may be numbered sequentially, such as "Data flow002," "Data flow003," and so on, such as in Table 1.

In some embodiments, examining a network message may also include identifying the protocol 427 of the network message and labeling the network message with the protocol 427, as in steps 335 to 339. In some embodiments, one or more protocols 427 may be identified in a functional network flow. In some embodiments, an unclassified protocol label may be created upon identifying a new protocol 427. In some embodiments, an unclassified protocol label may be "Protocol001." Subsequently identified protocols 427 that are different may be numbered sequentially, such as "Protocol002," "Protocol003," and so on. In other embodiments, the packet analyzer tool may automatically identify the protocol classification from the network packet's raw data, such as functional network flow 4 in Table 1.

Once identified, the plurality of attributes 415 of the network message is classified at step 407. In some embodiments, step 407 corresponds to step 347 and/or 353, as described in FIGS. 3A, 3B, and 3C. In some embodiments, the plurality of attributes 415 may be classified by a classification module executed on a processor, such as classification module 652 as further described in FIG. 6. In some embodiments, classifying the plurality of attributes 415 may include searching one or more sources 431 to retrieve (429) previously classified attributes corresponding to predetermined functional network flows. In some embodiments, the one or more sources 431 may include local storage or global databases accessed through a global network. In some embodiments, predetermined functional network flows may have been previously classified by one or more users. In some embodiments, the predetermined classifications may be included in one or more classification files. In other embodiments, classifying the plurality of attributes 415 may additionally, or alternatively, include prompting (433) a user to input a classification for one or more labeled attributes 415. In some embodiments, prompting (433) a user may include prompting a user to select one or more classifications from a list of most relevant selections. In some embodiments, the relevant selections may be ranked based on similarities of functional network flows and/or attributes. An example of classified functional network flows is shown in Table 2.

A table corresponding to the one or more network messages corresponding to the functional network flow is automatically generated at step 409. In some embodiments, the table may be the functional network flow table utilized at step 343 above. In some embodiments, the table may include the classified network messages, as in Table 2. In some embodiments, the table may correspond to a grouping 441 of one or more functional network flows and may be organized by the flight phase 417 of the one or more network messages, as shown in Table 2. In some embodiments, the table includes one or more filter rules 435. In some embodiments, the table, such as Table 2, contains the information required by a processor for generating filter rules. In some embodiments, the table is used to determine (439) which communications are authorized during a particular context of the networked aviation system. In certain embodiments, the context of the networked aviation system may be defined by a date, a time, a location, a device state, and/or a flight phase corresponding to one or more avionic devices within the networked aviation system. In some embodiments, the rules 435 are DAC rules, such as those generated in step 357. In other embodiments, the rules 435 may be context aware filter rules based on flight phase. In various embodiments, the types of filter rules 435 generated are based on the operating system being used. In some embodiments, the DAC rules may be IPtables rules used in Linux tables. In other embodiments, other types of filter rules 435 may be generated based on the classified functional network flows, such as ip6tables, arptables, and ebtables.

At step 411, the one or more filter rules 435 are validated. At step 413, a plurality of stateful rules may be created by chaining one or more tables based on an attribute of the one or more network messages. As previously described in FIG. 3A-FIG. 3C, one or more filter rules may be chained to form a sequence protocol diagram at the sub-function level, such as 802.1x transactions. In certain embodiments, the one or more filter rules may include one or more deep packet filtering rules 437. In some embodiments, deep packet filter rules 437 may utilize the stateful filter rules created in step 413. Such deep packet filtering rules 437 may prevent unauthorized data flows on e-Enabled aviation platforms by examining the payloads of the one or more network packets.

Figure 5:
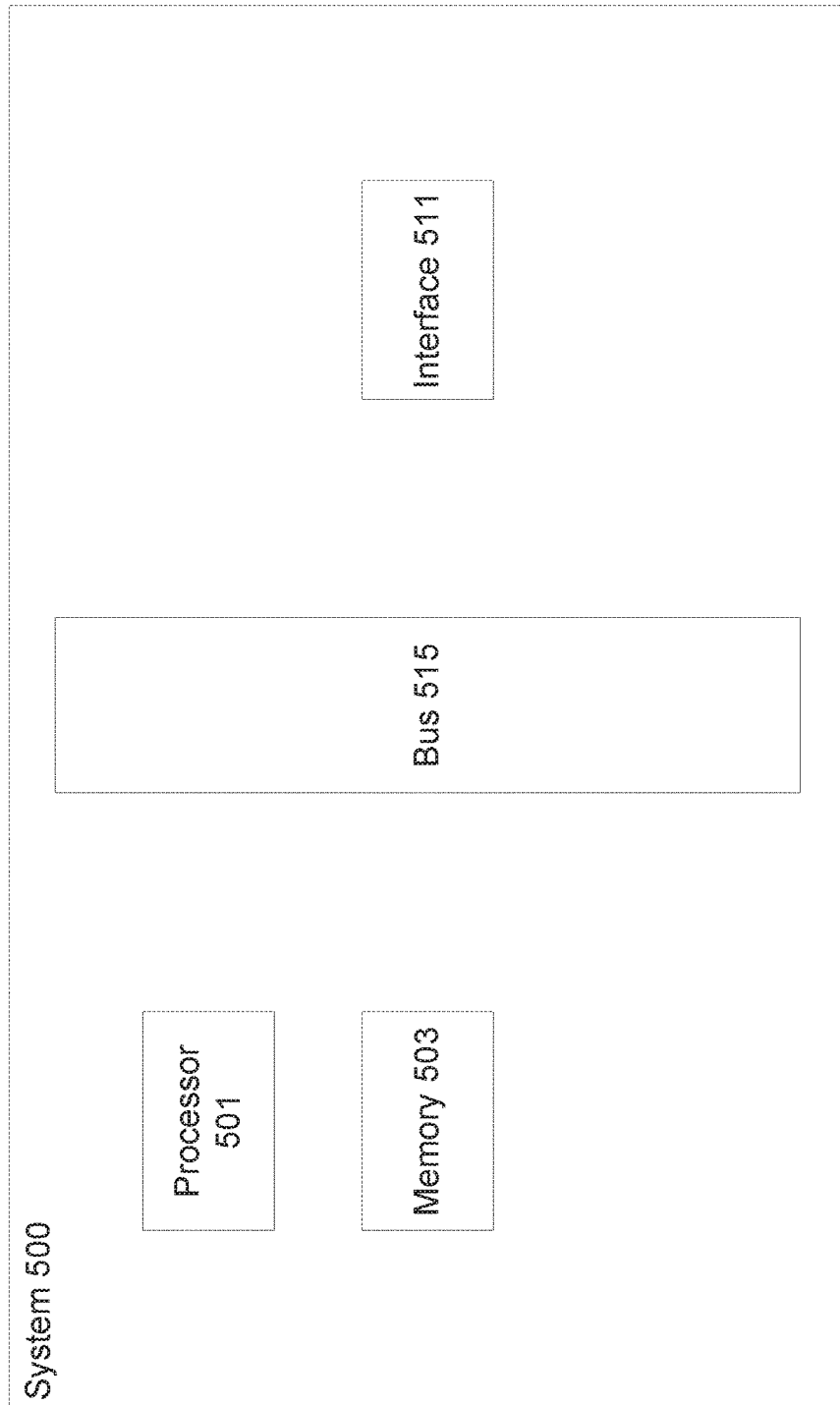
FIG. 5 is a block diagram illustrating an example of a system capable of implementing various processes described in the present disclosure.

FIG. 5 is a block diagram illustrating an example of a system 500 capable of implementing various processes described in the present disclosure. In some embodiments, system 500 may be a client device, such as computer 102 and/or computer 106, and one or more embodiments may be implemented in the form of a non-transitory computer readable medium storing one or more programs. According to particular embodiments, a system 500, suitable for implementing particular embodiments of the present disclosure, includes a processor 501, a memory 503, an interface 511, and a bus 515 (e.g., a PCI bus or other interconnection fabric) and operates as a streaming server. In some embodiments, when acting under the control of appropriate software or firmware, the processor 501 is responsible for the various steps described in FIG. 4, such as processing capturing network packets, as in step 401, parsing network packets and extracting network messages, as in step 403, examining the network messages, as in step 405, classifying attributes of the network message, as in step 407, generating a table of filter rules, as in step 409, validating the filter rules, as in step 411, etc. Various specially configured devices can also be used in place of a processor 501 or in addition to processor 501. In other embodiments, system 500 may also include one or more of the following elements: a pump, a timing element, a heating element, a thermostat, and a concentration detector.

The interface 511 is typically configured to send and receive data packets or data segments over a network, such as network 104. Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 500 uses memory 503 to store data and program instructions for operations including receiving user input, parsing network data packets and extracting network messages (such as in step 403), examining network messages and identifying message attributes (such as in step 405), receiving information from various sources (such as in step 407), generating tables of filter rules (such as in step 409), validating filter rules (such as in step 411), and chaining rules tables to create stateful filter rules (such as in step 413).

The program instructions may control the operation of an operating system and/or one or more applications, for example. The memory or memories may also be configured to store received metadata and batch requested metadata.

Because such information and program instructions may be employed to implement the systems/methods described herein, the present disclosure relates to tangible, or non-transitory, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Figure 6:
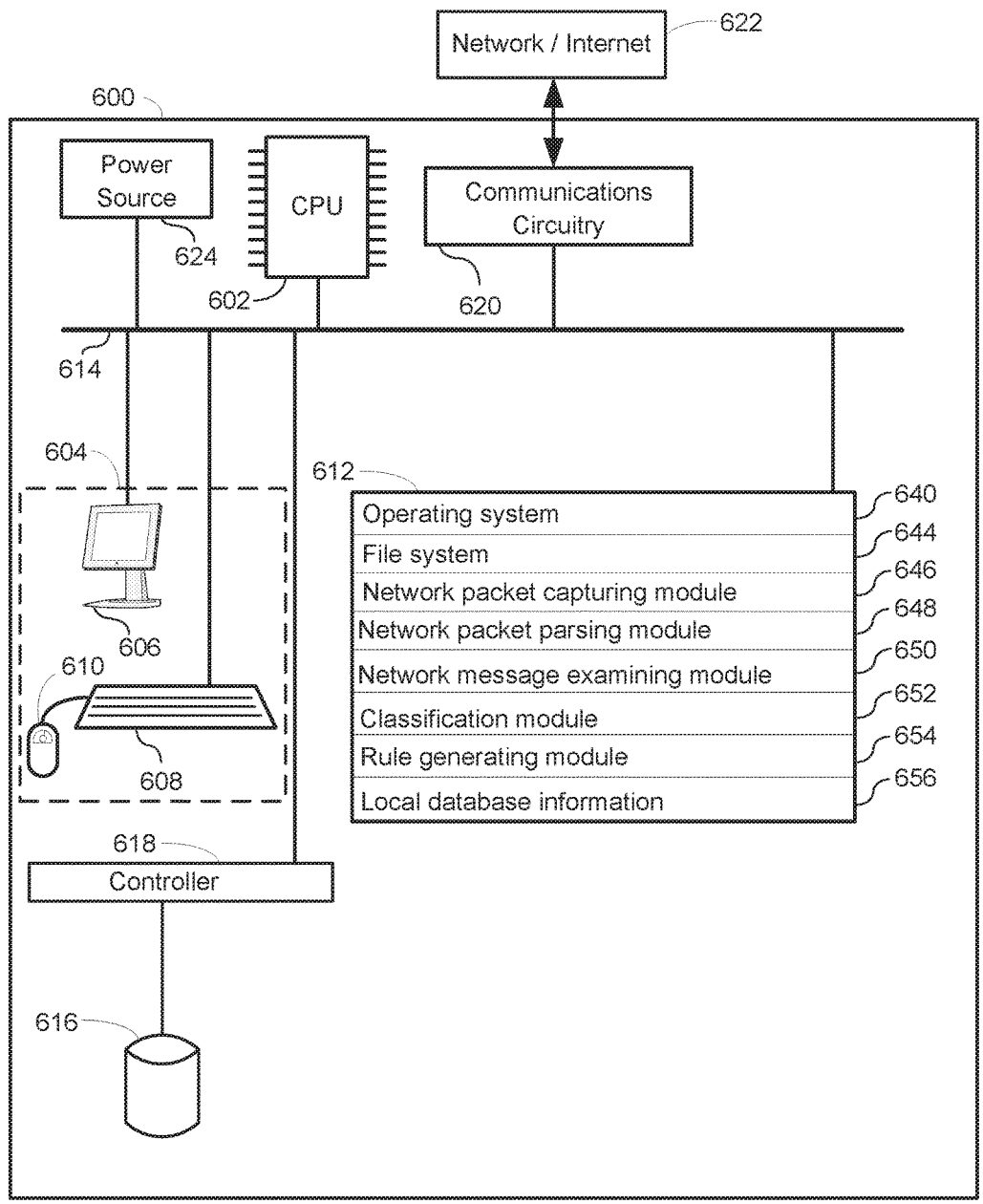
FIG. 6 is a block diagram illustrating an example of a computer system capable of implementing various processes described in the present disclosure.

FIG. 6 is a block diagram illustrating an example of a computer system capable of implementing various processes described in the present disclosure. In some embodiments, system 600 may be system 500. The system 600 typically includes a power source 624; one or more processing units (CPU's) 602 for executing modules, programs and/or instructions stored in memory 612 and thereby performing processing operations; one or more network or other communications circuitry or interfaces 620 for communicating with a network 622; controller 618; and one or more communication buses 614 for interconnecting these components. In some embodiments, network 622 can be the another communication bus, the Internet, an Ethernet, an Intranet, other wide area networks, local area networks (LANs), and metropolitan area networks. Communication buses 614 optionally include circuitry (sometimes called a chipset) that interconnects and controls communications between system components. System 600 optionally includes a user interface 604 comprising a display device 606, a keyboard 608, and a mouse 610. Memory 612 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 612 may optionally include one or more storage devices 616 remotely located from the CPU(s) 602. Memory 612, or alternately the non-volatile memory device(s) within memory 612, comprises a non-transitory computer readable storage medium. In some embodiments, memory 612, or the computer readable storage medium of memory 612 stores the following programs, modules and data structures, or a subset thereof:

- an operating system 640 that includes procedures for handling various basic system services and for performing hardware dependent tasks;
- a file system 644 for storing various program files;
- a network packet capture module 646 for receiving capturing network packets corresponding to one or more functional network flows on a network, such as network 104;
- a network packet parsing module 648 for implementing various packet analyzer applications for parsing the capture network packets and extracting network messages;
- a network message examining module 650 for examining the extracted network messages and identifying various message attributes, such as flight phase 417, function 421, sub-function 423, data flow 425, and protocol 427;
- a classification module 652 for classifying the identified message attributes by retrieving predetermined classifications from various local storage 616 and/or global databases on network 622, or prompting user for input at user interface 604;
- a rule generation module 654 for creating filter rules, including IP Tables like rules, deep packet filtering rules, and/or stateful filter rules for preventing unauthorized data flows on e-Enabled aviation platforms; and
- local database information 656 comprising identification and classification information of network messages and/or functional network flows.

In some embodiments, one or more of the above identified elements may be combined and/or share applications with one or more of the above identified elements. Each of the above identified elements may be stored in one or more of the previously mentioned memory devices, and corresponds to a set of instructions for performing a function described above. One or more of the above identified modules my operate by retrieving input from one or more local storage 616 or global databases on network 622, prompting for user input at user interface 604, or providing a user with generated rules at user interface 604. The above identified modules or programs (e.g., sets of instructions) need not be implemented as separate software programs, procedures or modules, and thus various subsets of these modules may be combined or otherwise re-arranged in various embodiments. In some embodiments, memory 612 may store a subset of the modules and data structures identified above. Furthermore, memory 612 may store additional modules and data structures not described above.

Although FIG. 6 shows a "system for automatically generating filter rules," FIG. 6 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 6 could be implemented on single servers and single items could be implemented by one or more servers. The actual number of servers used to implement a presentation generation system and how features are allocated among them will vary from one implementation to another, and may depend in part on the amount of data traffic that the system must handle during peak usage periods as well as during average usage periods.

While the present disclosure has been particularly shown and described with reference to specific embodiments thereof, it will be understood by those skilled in the art that changes in the form and details of the disclosed embodiments may be made without departing from the spirit or scope of the present disclosure. It is therefore intended that the present disclosure be interpreted to include all variations and equivalents that fall within the true spirit and scope of the present disclosure. Although many of the components and processes are described above in the singular for convenience, it will be appreciated by one of skill in the art that multiple components and repeated processes can also be used to practice the techniques of the present disclosure.

What is claimed is:

1. A method for automatically generating filter rules (435) comprising:
   capturing (401), by a processor of a computer system, one or more network packets corresponding to a functional network flow transmitted within a networked aviation system, wherein the functional network flow includes an airplane network data flow defined in a machine understandable form instead of being defined in paper interface control drawings describing data flows;
   parsing (403), by the processor, the one or more network packets in order to extract one or more network messages corresponding to the functional network flow;
   examining (405), by the processor, a network message of the one or more network messages in order to identify a plurality of attributes (415), wherein the plurality of attributes (415) correspond to header and data fields (406) of the one or more network packets corresponding to the network message;
   classifying (407), by a classification module executed on the processor, the plurality of attributes (415) of the network message, wherein classifying the plurality of attributes includes using a machine readable knowledge base;
   automatically generating (409) a table corresponding to the one or more network messages corresponding to the functional network flow based on the classified attributes, wherein the classified attributes include a flight phase, wherein automatically generating the table includes automatically generating one or more filter rules (435), and
   wherein the table is used to determine (439) which functional network flows are authorized during a particular context of the networked aviation system, wherein network packets in unauthorized functional flows are dropped and network packets in authorized functional flows are forwarded; and validating (411) the one or more filter rules (435).

2. The method of claim 1, wherein the plurality of attributes (415) include a combination of two or more of the following:
   a function (421),
   a sub-function (423),
   a data flow (425), and
   a protocol (427).

3. The method of claim 2, wherein examining (405) a network message includes:
   identifying the flight phase (417) of the network message and labeling the network message with the flight phase (417), wherein the flight phase (417) includes one or more of the following aircraft operational states (419): power on, pre-flight, engine start, in-gate; taxi-out, takeoff, initial climb, climb, enroute cruise, descent, approach land, rollout, taxi-in, go around, and engine shutdown;
   identifying the function (421) of the network message and labeling said network message with said function (421);
   identifying the sub-function (423) of the network message and labeling said network message with said sub-function (423);
   identifying the data flow (425) of the network message and labeling said network message with said data flow (425); and
   identifying the protocol (427) of the network message and labeling said network message with said protocol (427).

4. The method of claim 2, wherein the table corresponds to a grouping (441) of one or more functional network flows and is organized by the flight phase (417) of the one or more network messages.

5. The method of claim 1, wherein classifying (407) the plurality of attributes (415) includes one or more of the following:
   searching one or more sources (431) to retrieve (429) previously classified attributes corresponding to predetermined functional network flows; and
   prompting (433) a user to input a classification for one or more labeled attributes.

6. The method of claim 5, wherein the one or more sources (431) includes local storage or global databases accessed through a global network.

7. The method of claim 1, further comprising creating (413) a plurality of stateful filter rules (435) by chaining one or more tables based on an attribute (415) of the one or more network messages.

8. The method of claim 1; wherein the one or more filter rules (435) include one or more deep packet filtering rules (437), wherein the one or more deep packet filtering rules (437) prevent unauthorized data flows on e-Enabled aviation platforms by examining the payloads of the one or more network packets.

9. A system for automatically generating filter comprising:
   one or more processors;
   memory; and
   one or more programs stored in the memory, the one or more programs containing instructions for:
   capturing (401), by a processor of a computer system, one or more network packets corresponding to a functional network flow transmitted within a networked aviation system, wherein the functional network flow includes an airplane network data flow defined in a machine understandable form instead of being defined in paper interface control drawings describing data flows;
   parsing (403), by the processor, the one or more network packets in order to extract one or more network messages corresponding to the functional network flow;
   examining (405), by the processor, a network message of the one or more network messages in order to identify a plurality of attributes (415), wherein the plurality of attributes (415) correspond to header and data fields (406) of the one or more network packets corresponding to the network message;
   classifying (407), by a classification module executed on the processor, the plurality of attributes (415) of the network message, wherein classifying the plurality of attributes includes using a machine readable knowledge base;
   automatically generating (409) a table corresponding to the one or more network messages corresponding to the functional network flow based on the classified attributes, wherein the classified attributes include a flight phase, wherein automatically, generating the table includes automatically generating one or more filter rules (435), and
   wherein the table is used to determine (439) which functional network flows are authorized during a particular context of the networked aviation system, wherein network packets in unauthorized functional flows are dropped and network packets in authorized functional flows are forwarded; and
   validating (411) the one or more filter rules (435).

10. The system of claim 9, wherein the plurality of attributes (415) include a combination of two or more of the following:
- a function (421),
- a sub-function (423),
- a data flow (425), and
- a protocol (427).

11. The system of claim 10, wherein examining (405) a network message includes:
- identifying the flight phase (417) of the network message and labeling the network message with the flight phase (417); wherein the flight phase (417) includes one or more of the following aircraft operational states (419): power on, pre-flight, engine start, in-gate, taxi-out; takeoff, initial climb, climb, enroute cruise, descent, approach land, rollout, taxi-in, go around, and engine shutdown; and
- identifying the function (421) of the network message and labeling said network message with said function (421);
- identifying the sub-function (423) of the network message and labeling said network message with said sub-function (423);
- identifying the data flow (425) of the network message and labeling said network message with said data flow (425); and
- identifying the protocol (427) of the network message and labeling said network message with said protocol (427).

12. The system of claim 10, wherein the table corresponds to a grouping (441) of one or more functional network flows and is organized by the flight phase (417) of the one or more network messages.

13. The system of claim 9, wherein classifying (407) the plurality of attributes (415) includes one or more of the following:
- searching one or more sources (431) to retrieve (429) previously classified attributes corresponding to predetermined functional network flows; and
- prompting (433) a user to input a classification for one or more labeled attributes.

14. The system of claim 13, wherein the one or more sources (431) includes local storage or global databases accessed through a global network.

15. The system of claim 9, further comprising creating (413) a plurality of stateful filter rules (435) by chaining one or more tables based on an attribute (415) of the one or more network messages.

16. The system of claim 9, wherein the one or more filter rules (435) include one or more deep packet filtering rules (437), wherein the one or more deep packet filtering rules (437) prevent unauthorized data flows on e-Enabled aviation platforms by examining the payloads of the one or more network packets.

17. A non-transitory computer readable medium storing one or more programs configured for execution by a computer, the one or more programs comprising instructions for:
- capturing (401), by a processor of a computer system, one or more network packets corresponding to a functional network flow transmitted within a networked aviation system, wherein the functional network flow includes an airplane network data flow defined in a machine understandable form instead of being defined in paper interface control drawings describing data flows;
- parsing (403), by the processor, the one or more network packets in order to extract one or more network messages corresponding to the functional network flow;
- examining (405), by the processor, a network message of the one or more network messages in order to identify a plurality of attributes (415), wherein the plurality of attributes (415) correspond to header and data fields (406) of the one or more network packets corresponding to the network message;
- classifying (407), by a classification module executed on the processor, the plurality of attributes (415) of the network message, wherein classifying the plurality of attributes includes using a machine readable knowledge base;
- automatically generating (409) a table corresponding to the one or more network messages corresponding to the functional network flow based on the classified attributes, wherein the classified attributes include a flight phase, wherein automatically generating the table includes automatically generating one or more filter rules (435), and
- wherein the table is used to determine (439) which functional network flows are authorized during a particular context of the networked aviation system, wherein network packets in unauthorized functional flows are dropped and network packets in authorized functional flows are forwarded; and
- validating (411) the one or more filter rules (435).

18. The non-transitory computer readable medium of claim 17, wherein classifying (407) the plurality of attributes (415) includes one or more of the following:
- searching one or more sources (431) to retrieve (429) previously classified attributes corresponding to predetermined functional network flows; and
- prompting (433) a user to input a classification for one or more labeled attributes.

19. The non-transitory computer readable medium of claim 17, further comprising creating (413) a plurality of stateful filter rules (435) by chaining one or more tables based on an attribute (415) of the one or more network messages.

20. The non-transitory computer readable medium of claim 17, wherein the one or more filter rules (435) include one or more deep packet filtering rules (437), wherein the one or more deep packet filtering rules (437) prevent unauthorized data flows on e-Enabled aviation platforms by examining the payloads of the one or more network packets.

* * * * *